United States Patent
Tanaka

(10) Patent No.: US 9,069,392 B2
(45) Date of Patent: Jun. 30, 2015

(54) OPERATIONAL DISPLAY DEVICE AND METHOD OF CONTROLLING THE SAME, AND RECORDING MEDIUM

(71) Applicant: Tomoji Tanaka, Toyokawa (JP)

(72) Inventor: Tomoji Tanaka, Toyokawa (JP)

(73) Assignee: KONICA MINOLTA BUSINESS TECHNOLOGIES, INC., Chiyoda-ku, Tokyo (JP)

( * ) Notice: Subject to any disclaimer, the term of this patent is extended or adjusted under 35 U.S.C. 154(b) by 195 days.

(21) Appl. No.: 13/731,138

(22) Filed: Dec. 31, 2012

(65) Prior Publication Data
US 2013/0176222 A1    Jul. 11, 2013

(30) Foreign Application Priority Data

Jan. 5, 2012 (JP) .................................. 2012-000527

(51) Int. Cl.
| | |
|---|---|
| G06F 3/033 | (2013.01) |
| G09G 5/08 | (2006.01) |
| G09G 5/00 | (2006.01) |
| G06F 3/0484 | (2013.01) |
| G06F 3/0346 | (2013.01) |
| H04N 1/00 | (2006.01) |

(52) U.S. Cl.
CPC ........ *G06F 3/033* (2013.01); *G06F 2200/1614* (2013.01); *G06F 2203/04806* (2013.01); *G06F 3/04845* (2013.01); *G06F 3/0484* (2013.01); *G06F 3/0346* (2013.01); *H04N 1/00411* (2013.01); *H04N 1/00458* (2013.01); *H04N 1/00469* (2013.01); *H04N 1/00496* (2013.01)

(58) Field of Classification Search
CPC .................. G06F 2203/04806; G06F 3/04845; G06F 3/0346; G06F 2200/1614

USPC .................................................. 345/156–184
See application file for complete search history.

(56) References Cited

U.S. PATENT DOCUMENTS

| | | | |
|---|---|---|---|
| 2002/0039092 | A1 | 4/2002 | Shigetaka |
| 2008/0076481 | A1 | 3/2008 | Iwasaki et al. |
| 2010/0058254 | A1 | 3/2010 | Narita |
| 2013/0033645 | A1* | 2/2013 | Jellicoe .......................... 348/564 |

FOREIGN PATENT DOCUMENTS

| | | |
|---|---|---|
| JP | 2000-098990 A | 4/2000 |
| JP | 2002-082765 A | 3/2002 |

(Continued)

OTHER PUBLICATIONS

Office Action (Decision to Grant Patent) issued on Apr. 1, 2014, by the Japan Patent Office in corresponding Japanese Patent Application No. 2012-000527, and an English Translation of the Office Action. (6 pages).

(Continued)

*Primary Examiner* — Kathy Wang-Hurst
*Assistant Examiner* — David Tung
(74) *Attorney, Agent, or Firm* — Buchanan Ingersoll & Rooney PC

(57) ABSTRACT

An operational display device includes a display portion for displaying an image based on image data including a specific portion, a detection portion for detecting an orientation in which the display portion is held, and a display control unit for controlling a manner of display on the display portion. The display control unit causes an image of the specific portion to be displayed as being zoomed-in and rotated in accordance with an orientation of holding of the display portion when the orientation in which the display portion is held is changed from a first orientation to a second orientation.

19 Claims, 20 Drawing Sheets

(56) References Cited

FOREIGN PATENT DOCUMENTS

| JP | 2003-296701 A | 10/2003 |
|----|---------------|---------|
| JP | 2005-156627 A | 6/2005  |
| JP | 2008-076818 A | 4/2008  |
| JP | 2010-055511 A | 3/2010  |

OTHER PUBLICATIONS

Office Action (Notice of Grounds of Rejection) issued on Jan. 14, 2014, by the Japanese Patent Office in corresponding Japanese Patent Application No. 2012-000527, and an English Translation of the Office Action. (4 pages).

* cited by examiner

FIG.3
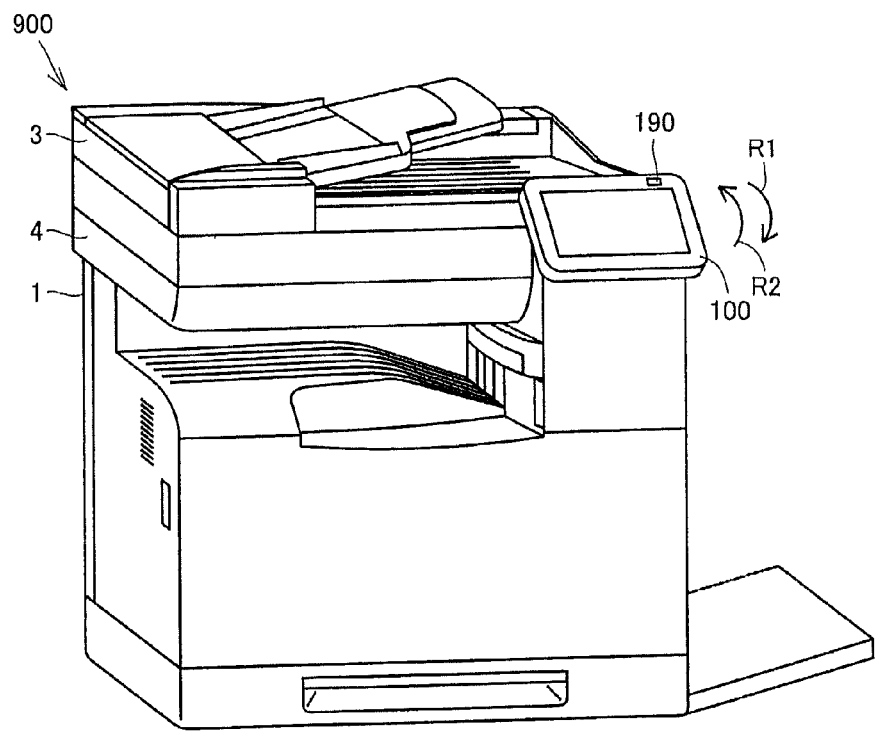
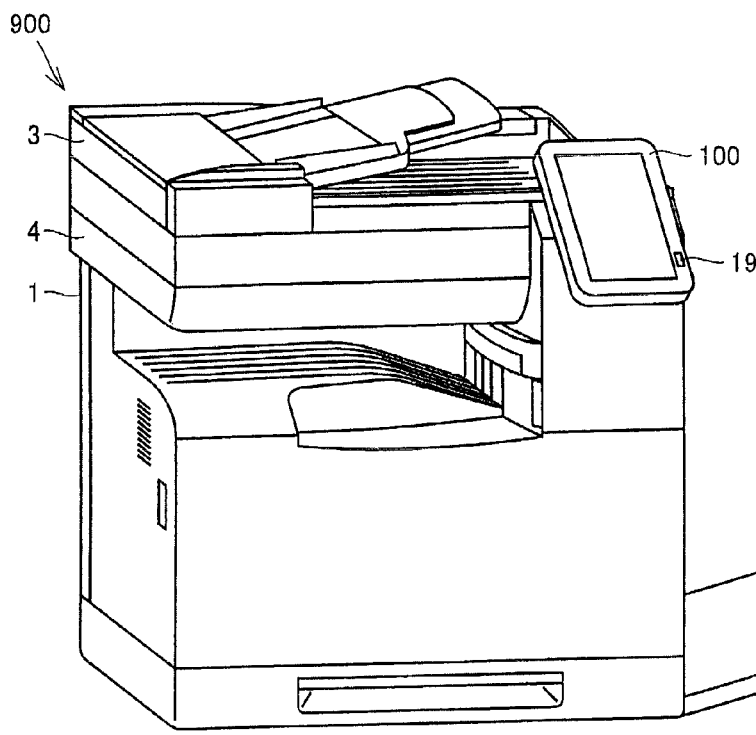

OPERATIONAL DISPLAY DEVICE AND METHOD OF CONTROLLING THE SAME, AND RECORDING MEDIUM

This application is based on Japanese Patent Application No. 2012-000527 filed with the Japan Patent Office on Jan. 5, 2012, the entire content of which is hereby incorporated by reference.

BACKGROUND OF THE INVENTION

1. Field of the Invention

The present invention relates to an operational display device and a method of controlling the same as well as a recording medium, and particularly to an operational display device capable of changing a direction of a display portion and a method of controlling the same as well as a recording medium.

2. Description of the Related Art

Recently, an electrostatic touch panel has been introduced as a touch panel representing one example of an operation and input device. In design thereof, a frame is narrowed and flat design is adopted, and hardware keys are eliminated as much as possible.

Such a touch panel has become a mainstream of a new operation and input device mainly operated through a touch operation, which is represented by a smartphone or a tablet terminal. In a general tablet terminal, an application for displaying such an image as a photograph or a text document is provided with such control that a display image of interest is always erected when viewed from a user.

In such an operational display device having a function to always have an erected display image displayed to a user, whether or not to activate automatic rotational display on an application level is set. In addition, control as described above is made use of as a function convenient for a user, which allows easy view of erected display as a photograph viewer or in the case where a user views a text document.

For example, Patent Literature 1 (Japanese Laid-Open Patent Publication No. 2010-055511) proposes an apparatus including a display unit for displaying an image on a screen based on image data, a touch panel, and an angle detection unit, in which a displayed image is displayed in a zoomed-in or zoomed-out manner in accordance with an angle of rotation of the display unit onto which a touch operation is being provided, so that the displayed image is always erected when viewed from a user and processing for zoom-in and zoom-out display in a zoom operation and for movement of an object to be focused on is performed quickly in a simplified manner.

Likewise a touch panel provided in an MFP (Multi Function Peripheral) representing one example of a multi function machine having a plurality of functions such as copying or facsimile, in an operation and input device where an operation icon (button) is arranged for setting various functions or making transition to another screen, it is usual to create a display image with display on a horizontally oriented LCD (Liquid Crystal Display) being defined as the reference.

In the case of a (movable) operational display device in which a direction of a display device can be changed to a vertically oriented direction or in the case of a portable removable operational display device, the following problems which have not occurred in a fixed display device arise.

For example, such a rotational display function that an image is always erected when viewed from a user is available as one of display functions. If a display device has such a rotational display function, a (horizontally oriented) display image designed with display on a horizontally oriented LCD being defined as the reference is displayed in a zoomed-out manner in its entirety in accordance with a width dimension of LCD display when the display device is rotated and held in a vertically oriented direction. Therefore, since characters, photographs, and the like are displayed with a small size, visibility becomes poor.

It may be possible to solve this problem by realizing zoom-in display at prescribed magnification through a zoom-in display operation key input such as an operation of a touch panel icon, however, it may be difficult to realize zoom-in display with an intended portion being focused on. Therefore, there has been a case where only zoom-in display can be realized with a display center of rendering at the same magnification being defined as the reference.

With a touch panel adapted to multiple touch operations, an operation for zoom-in display with focus being placed on any area can be performed by performing a pinching operation. Whether or not a user can realize zoom-in display of his/her intended whole area, however, is dependent on setting of fixed magnification in a zoom-in operation. Therefore, there may also be a case where an area in which zoom was intended may not be included in a zoomed-in screen.

Furthermore, it is also possible that a user's operational procedure increases and an operation becomes troublesome. For example, each time a direction of holding of a display device is rotated, the user has to perform a zoom-in operation.

In addition, with the conventional operation and input device disclosed in Patent Literature 1 described above, though an operation for zoom-in display in a zoom operation and for movement of an object to be focused on can quickly be performed, a touch operation for selecting an area of interest is necessary and such a method is not necessarily an easy-to-use operation method. In particular, in realizing a display function to rotate a display image by 90 degrees for display such that the image erects from a viewpoint of a user when a direction of holding of an operational display device is rotated by 90 degrees, the user has to perform an operation to change a direction of holding while he/she performs a touch operation of an area of interest, which makes an operation extremely difficult.

The present invention was made in view of such circumstances and an object thereof is to improve visibility of a part of an image displayed on a display screen without a troublesome operation in an operational display device.

SUMMARY OF THE INVENTION

According to one aspect, an operational display device is provided. The operational display device includes a display portion for displaying an image based on image data including a specific portion, a detection portion for detecting an orientation in which the display portion is held, and a display control unit for controlling a manner of display on the display portion. The display control unit causes an image of the specific portion to be rotated and displayed as being zoomed-in in accordance with an orientation of holding of the display portion when the orientation in which the display portion is held is changed from a first orientation to a second orientation.

Preferably, the operational display device further includes an image processing portion for processing the image data. The specific portion is a portion displaying a preview screen of the image data processed by the image processing portion.

Preferably, the specific portion is a portion for accepting an instruction for an operation on the operational display device.

Preferably, list display refers to scroll display of a list of instructions for operation.

Preferably, the display control unit causes the display portion to display the image data including a plurality of specific portions. The operational display device further includes an input portion for accepting selection of one specific portion from among the plurality of specific portions. The display control unit provides zoom-in display of an image of the selected specific portion when the orientation in which the display portion is held is changed from the first orientation to the second orientation.

Preferably, the display control unit cancels zoom-in display of the specific portion when the orientation in which the display portion is held is changed from the second orientation to the first orientation.

Preferably, the display control unit causes the display portion to provide maximum display of the image of the specific portion without changing an aspect ratio when the orientation in which the display portion is held is changed from the first orientation to the second orientation.

Preferably, a longitudinal direction of a display area on the display portion is changed when the orientation in which the display portion is held is changed from the first orientation to the second orientation. The display control unit determines whether or not the longitudinal direction of the display area and a longitudinal direction of the image of the specific portion cross each other when the display portion is in the first orientation. When the display control unit determines that they cross each other, the display control unit causes the image of the specific portion to be rotated and displayed as being zoomed-in in accordance with the orientation of holding of the display portion as the orientation in which the display portion is held is changed from the first orientation to the second orientation. When the display control unit determines that they do not cross each other, the display control unit causes the image of the specific portion to be displayed as being zoomed-in without rotating the image as the orientation in which the display portion is held is changed from the first orientation to the second orientation.

According to another aspect, a method of controlling an operational display device performed by a computer of the operational display device including a display portion for displaying an image based on image data including a specific portion is provided. The method includes detecting an orientation in which the display portion is held, and rotating and displaying an image of the specific portion as being zoomed-in in accordance with an orientation of holding of the display portion when the orientation in which the display portion is held is changed from a first orientation to a second orientation.

According to yet another aspect, a non-transitory computer readable recording medium recording a program executable by a computer of an operational display device including a display portion for displaying an image based on image data including a specific portion is provided. The program causes the computer to perform detecting an orientation in which the display portion is held, and rotating and displaying an image of the specific portion as being zoomed-in in accordance with an orientation of holding of the display portion when the orientation in which the display portion is held is changed from a first orientation to a second orientation.

According to one aspect, in an operational display device, visibility of a part of an image displayed on a display screen can be improved without a troublesome operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing appearance of the multi function machine in FIG. 1.

DESCRIPTION OF THE PREFERRED EMBODIMENTS

Figure 1:
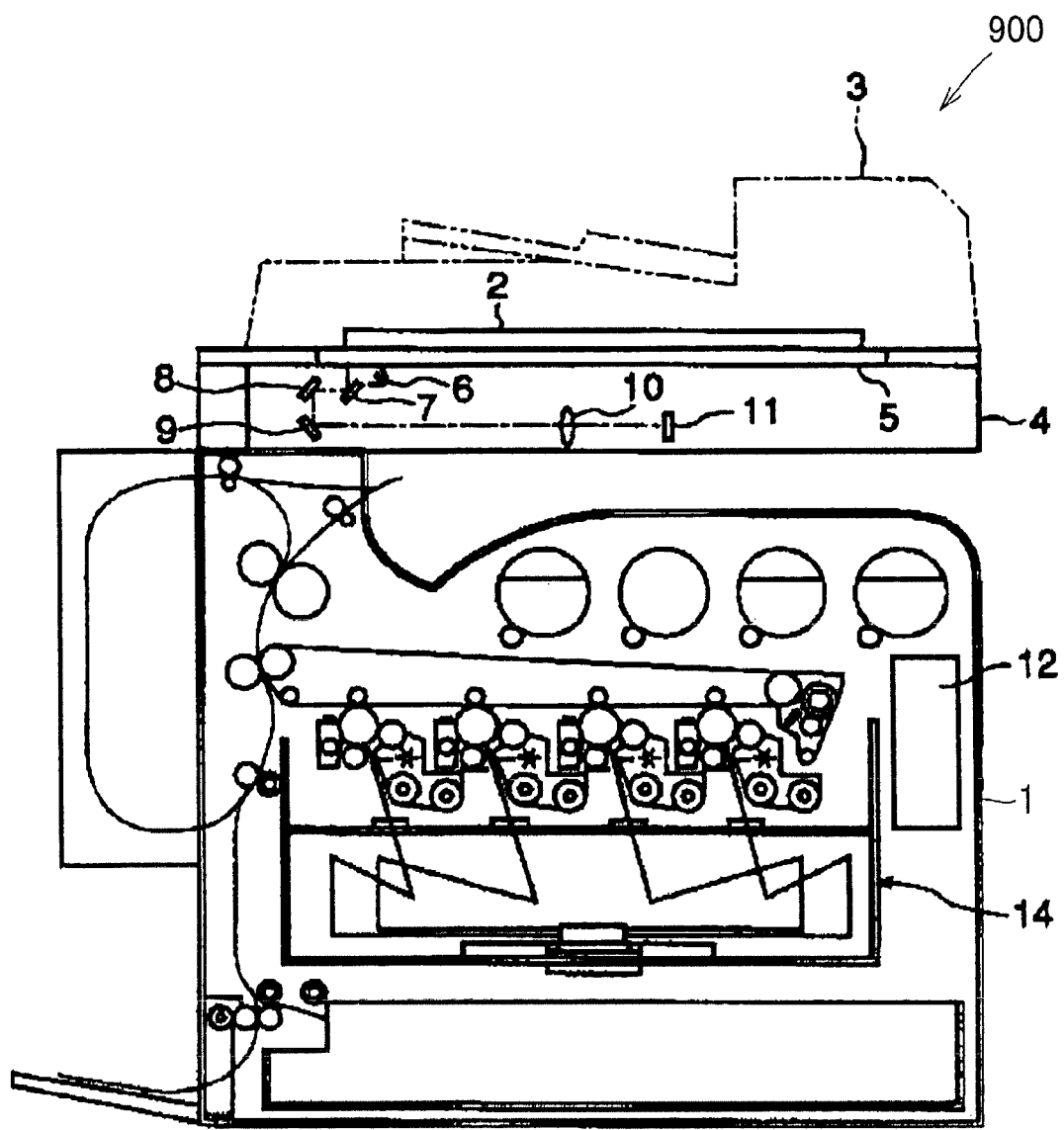
FIG. 1 is a rear cross-sectional view representing an internal hardware configuration of a multi function machine according to the present embodiment.

An embodiment of the present invention will be described hereinafter with reference to the drawings. In the description below, the same elements have the same reference characters allotted. Their label and function are also identical. Therefore, detailed description thereof will not be repeated.

<Internal Structure of Operational Display Device>

Figure 2:
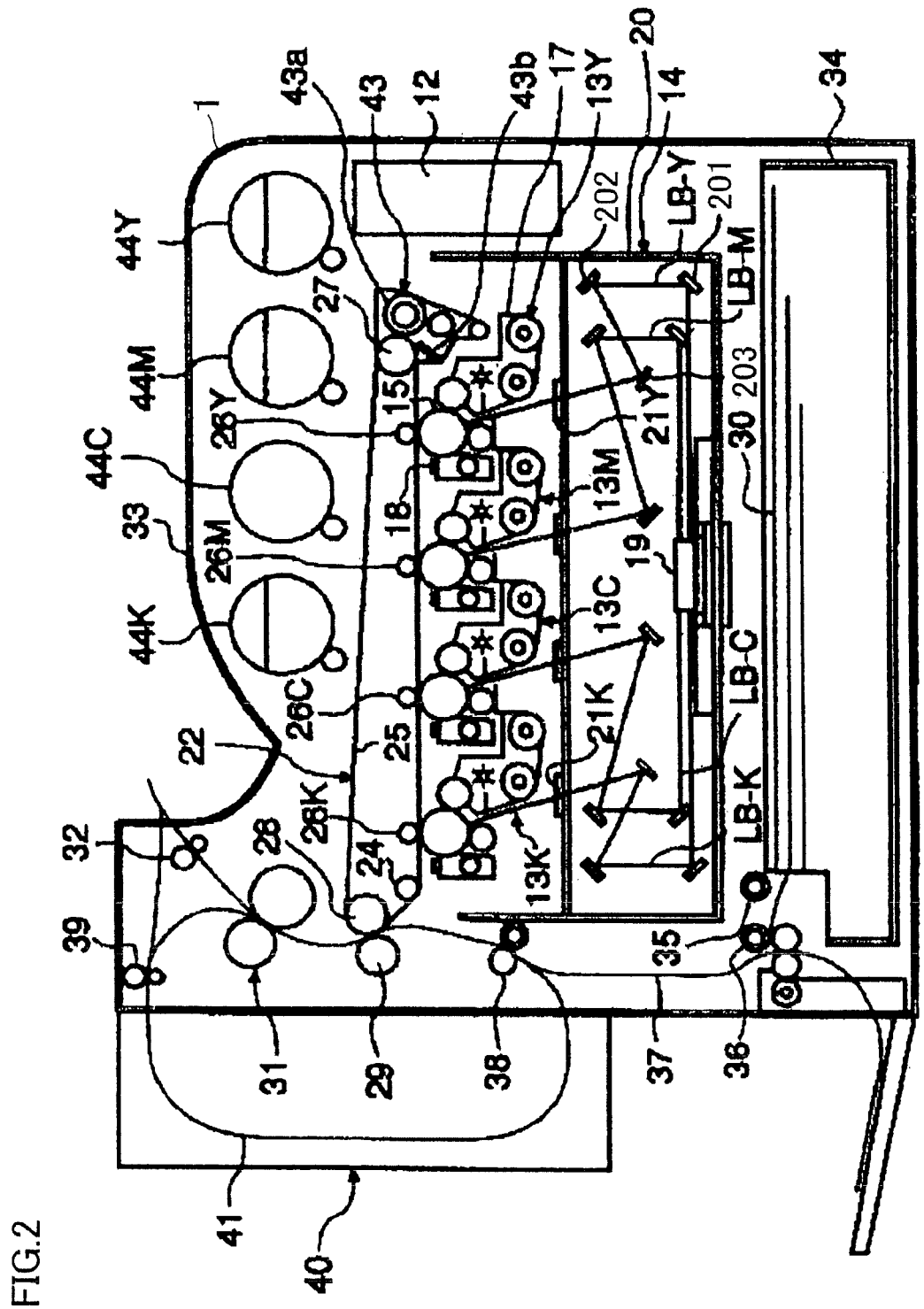
FIG. 2 is a rear cross-sectional view representing a hardware configuration of an engine portion of the multi function machine in FIG. 1.

FIG. 1 is a rear cross-sectional view representing an internal hardware configuration of a multi function machine 900 according to the present embodiment. FIG. 2 is a rear cross-sectional view representing a hardware configuration of an engine portion of multi function machine 900 in FIG. 1. One manner of an internal structure of multi function machine 900 according to the present embodiment will initially be described.

In the present embodiment, a tandem-type digital color multi function machine will be described by way of example of multi function machine 900. It is noted that the digital color multi function machine can generally execute a scan job for scanning an image of a set document and storing the image in an HDD (hard disk drive) or the like, a copy job for further printing the image on a sheet of paper or the like, a print job for print on a sheet of paper based on a print instruction from an external terminal such as a personal computer (hereinafter also denoted as a PC), a facsimile job for receiving facsimile data from a facsimile machine or the like and storing the data in the HDD or the like, an HDD print job (a BOX print job) for printing an image stored in the HDD or the like on a sheet of paper or the like, and so forth.

Referring to FIGS. 1 and 2, in an upper portion of a main body 1, an automatic document feeder (ADF) 3 for automatically transporting a document 2 one by one separately and an image scanner 4 for scanning an image on document 2 transported by automatic document feeder 3 are arranged. Image scanner 4 irradiates document 2 placed on a platen glass 5 with a light source 6. Image scanner 4 scans for exposure, a reflected light image from document 2 on an image scanning element 11 implemented by a CCD (charge coupled device) or the like through a reduction optical system constituted of a full rate mirror 7, half rate mirrors 8, 9 and an imaging lens 10. Image scanner 4 uses image scanning element 11 to scan a color material reflected light image of document 2 at prescribed dot density (for example, 16 dots/mm).

Image scanner 4 has such document scanning functions as scanning a FAX transmission document, Scan to E-Mail, Box saving, and the like. A color material reflected light image of document 2 scanned by image scanner 4 is sent to an image processing portion 12, for example, as document reflectance data of three colors of red (R), green (G), blue (B) (each having 8 bits).

Image processing portion 12 subjects the reflectance data of document 2 to prescribed image processing such as shading correction, position displacement correction, lightness/color space conversion, gamma correction, erasing of a frame, edition of color/movement, and the like. In addition, image processing portion 12 can also subject image data sent from a personal computer or the like to prescribed image processing. The image data subjected to prescribed image processing by image processing portion 12 is again converted by image processing portion 12 to document reproduction color material gradation data of four colors of yellow (Y), magenta (M), cyan (C), black (K) (each having 8 bits). The image data is sent to a print head 14, which carries out image exposure onto image forming units 13Y, 13M, 13C, 13K of respective colors of yellow (Y), magenta (M), cyan (C), black (K). Print head 14 serving as an image exposure apparatus carries out image exposure using a laser beam LB, in accordance with the document reproduction color material gradation data of a prescribed color.

In a case of a tandem-type digital color multi function machine, in main body 1, as shown in FIGS. 1 and 2, four image forming units 13Y, 13M, 13C, 13K of yellow (Y), magenta (M), cyan (C), black (K) are arranged in parallel at regular intervals in a horizontal direction. These four image forming units 13Y, 13M, 13C, 13K are all configured similarly to one another.

Each of four image forming units 13Y, 13M, 13C, 13K is constituted of a photoconductor drum 15 serving as an image carrier rotationally driven at a prescribed speed, a charging roller for primary charging for uniformly charging a surface of this photoconductor drum 15, print head 14 serving as an image exposure apparatus for forming by exposure, an image corresponding to a prescribed color on a surface of photoconductor drum 15 to thereby form an electrostatic latent image, a developer 17 for developing the electrostatic latent image formed on photoconductor drum 15 with toner of a prescribed color, and a cleaning apparatus 18 for cleaning the surface of photoconductor drum 15.

As shown in FIGS. 1 and 2, print head 14 is configured in common to four image forming units 13Y, 13M, 13C, 13K. Print head 14 modulates not-shown four semiconductor lasers in accordance with the document reproduction color material gradation data of respective colors and emits laser beams LB-Y, LB-M, LB-C, LB-K from the respective semiconductor lasers in accordance with the gradation data. It is noted that print head 14 above may individually be configured for each of the plurality of image forming units.

One rotating polygon mirror 19 is irradiated with laser beams LB-Y, LB-M, LB-C, LB-K emitted from the four respective semiconductor lasers and it deflects and scans the laser beams. Here, among laser beams LB-Y, LB-M, LB-C, LB-K emitted from the four respective semiconductor lasers above, laser beam LB-Y and laser beam LB-M are emitted toward one side surface of rotating polygon mirror 19 and other laser beams LB-C and laser beam LB-K are emitted toward the other side surface of rotating polygon mirror 19.

Consequently, laser beams LB-Y, LB-M and laser beams LB-C, LB-K are opposite to each other in a direction of deflection and scanning by rotating polygon mirror 19. Laser beams LB-Y, LB-M, LB-C, LB-K deflected and scanned by rotating polygon mirror 19 are reflected by a plurality of reflection mirrors 201 to 203 through a not shown f-θ lens. Laser beams LB-Y, LB-M, LB-C, LB-K are scanned for exposure onto photoconductor drums 15 in respective image forming units through a window 21 from diagonally below.

Image processing portion 12 successively outputs image data of respective colors to print head 14 provided in common to image forming units 13Y, 13M, 13C, 13K of respective colors of yellow (Y), magenta (M), cyan (C), black (K), and laser beams LB-Y, LB-M, LB-C, LB-K emitted from this print head 14 in accordance with the image data are scanned for exposure onto the respective surfaces of corresponding photoconductor drums 15. An electrostatic latent image is thus formed.

Then, the electrostatic latent image formed on photoconductor drum 15 is developed by developer 17 as a toner image of each color of yellow (Y), magenta (M), cyan (C), black (K), as shown in FIGS. 1 and 2. The toner images of respective colors of yellow (Y), magenta (M), cyan (C), black (K) are multiply transferred by primary transfer rollers 26 onto an intermediate transfer belt 25 of an intermediate transfer belt unit 22 arranged above each image forming unit 13Y, 13M, 13C, 13K.

Intermediate transfer belt 25 is wound around a drive roller 27, a back-up roller 28 and a tension roller 24 at constant tension. Intermediate transfer belt 25 is circulated and driven in a prescribed direction at a prescribed speed by drive roller 27 rotationally driven by a not-shown dedicated drive motor having excellent constant speed property. For example, a belt made by forming a film of a synthetic resin such as flexible polyimide like a band and connecting opposing ends of the synthetic resin film formed like a band with such means as welding to thereby form the film like an endless belt is employed as intermediate transfer belt 25.

The toner image of respective colors of yellow (Y), magenta (M), cyan (C), black (K) multiply transferred onto intermediate transfer belt 25 above is secondarily transferred onto a sheet of transfer paper 30 serving as a transfer material, by a secondary transfer roller 29 pressed against back-up roller 28 with the intermediate transfer belt being interposed, by means of pressing force and electrostatic force. Transfer paper 30 onto which the toner images of respective colors has been transferred is transported to a fixer 31 located above.

Secondary transfer roller 29 is located on the side of back-up roller 28. Secondary transfer roller 29 secondarily collectively transfers the toner images of respective colors onto transfer paper 30 transported from below to above. Then, transfer paper 30 onto which the toner images of respective colors have been transferred is subjected to a fixation process with heat and pressure by fixer 31 and thereafter ejected on an ejection tray 33 provided in the upper portion of main body 1 by an ejection roller 32.

In the present embodiment, transfer paper 30 having a prescribed size is transported from a paper feed cassette 34 through a paper transport path 37 to a register roller 38 by a paper feed roller 35 and a roller pair 36 for separated paper transport, and stopped there. Transfer paper 30 is sent to a secondary transfer position of intermediate transfer belt 25 by register roller 38 that rotates at prescribed timing.

It is noted that, in a case of image formation on opposing surfaces of transfer paper 30 in the digital color multi function machine, transfer paper 30 on which one surface an image has been fixed is not ejected to ejection tray 33 by ejection roller 32 as it is. The digital color multi function machine switches a direction of transport of transfer paper 30 by using a not-shown switching gate and transports transfer paper 30 to a both-surface transport unit 40 through a roller pair 39 for paper transport.

Both-surface transport unit 40 transports transfer paper 30 again to register roller 38 by using a not-shown transport roller pair provided along a transport path 41, with transfer paper 30 being turned over. Then, after the image is transferred and fixed onto the back surface of transfer paper 30, transfer paper 30 is ejected on ejection tray 33. Toner cartridges 44Y, 44M, 44C, 44K in FIGS. 1 and 2 represent toner cartridges for supplying toner of prescribed colors to developers 17 of respective colors of yellow (Y), magenta (M), cyan (C), black (K).

<Appearance of Operational Display Device>

FIG. 3(A) and FIG. 3(B) are diagrams showing appearance of multi function machine 900.

Referring first to FIG. 3(A), an operation panel 100 is attached to a front surface of main body 1 of multi function machine 900. A coupling shaft for fixing operation panel 100 to main body 1 is attached to a rear surface of operation panel 100. Namely, operation panel 100 is fixed to main body 1 to be rotatable around the coupling shaft. Operation panel 100 represents one example of an operational display device in the present embodiment. It is noted that operation panel 100 may also operate under the control by the main body of multi function machine 900. In this case, an operational display device is implemented by multi function machine 900.

Operation panel 100 is constructed to be rotatable around the coupling shaft, both in an orientation shown with an arrow R1 and in an orientation shown with an arrow R2 in FIG. 3(A). FIG. 3(B) shows a state in which operation panel 100 is rotated by 90 degrees in the orientation shown with arrow R1 from the state shown in FIG. 3(A). It is noted that an angle of rotation of operation panel 100 is not limited to 90 degrees and it can be rotated by 360 degrees.

<Hardware Configuration of Operational Display Device>

A hardware configuration of multi function machine 900 (digital color multi function machine) will now be described.

Figure 4:
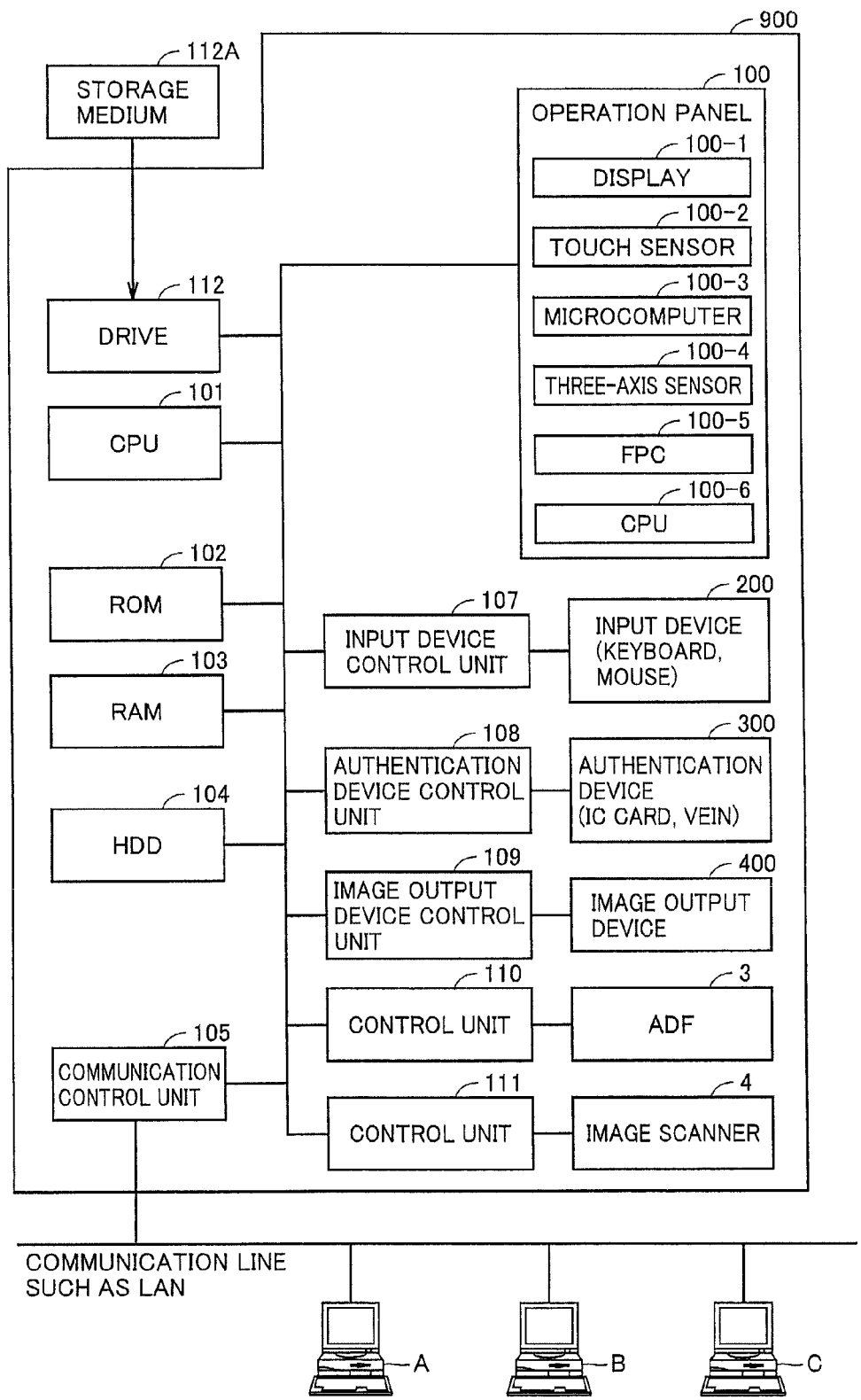
FIG. 4 is a control block diagram of the multi function machine in FIG. 1.

FIG. 4 is a control block diagram of multi function machine 900.

Referring to FIG. 4, multi function machine 900 includes a CPU 101, a ROM 102, a RAM 103, a hard disk drive (HDD) 104, an input device control unit 107, an authentication device control unit 108, and an image output device control unit 109, which are connected to one another through a bus.

CPU 101 intensively controls an overall operation of multi function machine 900 (digital color multi function machine).

ROM 102 is a memory for storing an operating program for CPU 101. RAM 103 is a memory for providing a work area for CPU 101 to operate. HDD 104 temporarily stores a copy image or image data from a print instruction terminal such as a PC and saves Box data such as a scanned image.

It is noted that an operating program executed by CPU 101 may be stored in a storage medium attachable to and removable from multi function machine 900. In this case, CPU 101 reads the program stored in a storage medium 112A through a drive 112. Examples of storage media 112A include media storing a program in a non-volatile manner, such as a CD-ROM (Compact Disk-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical) Disk, an MD (Mini Disk), an IC (Integrated Circuit) card (except for memory cards), an optical card, a mask ROM, an EPROM, an EEPROM (Electronically Erasable Programmable Read Only Memory), and the like.

In addition, multi function machine 900 includes operation panel 100, an input device 200, an authentication device 300, and an image output device 400.

Operation panel 100 is implemented, for example, by a touch panel configured with various displays 100-1 such as a liquid crystal display (LCD) and a touch sensor 100-2 arranged on display 100-1. Operation panel 100 further includes a microcomputer 100-3 for touch panel, a three-axis sensor 100-4, an FPC (Flexible Printed Circuits) 100-5, and a CPU (Central Processing Unit) 100-6. Moreover, operation panel 100 includes hardware keys (not shown) as an input device separate from touch sensor 100-2. A configuration of operation panel 100 will be described later with reference to FIG. 5.

It is noted that at least a part of lines connecting CPU 101 and operation panel 100 to each other passes through the inside of the coupling shaft above for coupling operation panel 100 and main body 1 to each other. In addition, as described with reference to FIG. 3(A) and FIG. 3(B), operation panel 100 is fixed to main body 1 in a rotatable manner. Thus, at least a part of lines connecting CPU 101 and operation panel 100 to each other is preferably a flexible line.

Input device 200 is implemented by a keyboard, a mouse, or the like, which is not shown.

Authentication device 300 is implemented by any of a contact/contactless IC (integrated circuit) card authentication device, a finger vein authentication device, and the like.

Image output device 400 means a portion in multi function machine 900 for performing print processing, and includes print head 14, photoconductor drum 15, cleaning apparatus 18, and a motor (not shown) for transporting a sheet of paper on which an image is to be formed.

In addition, multi function machine 900 includes a control unit 110 for controlling an operation of ADF 3 and a control unit 111 for controlling an operation of image scanner 4.

Figure 5:
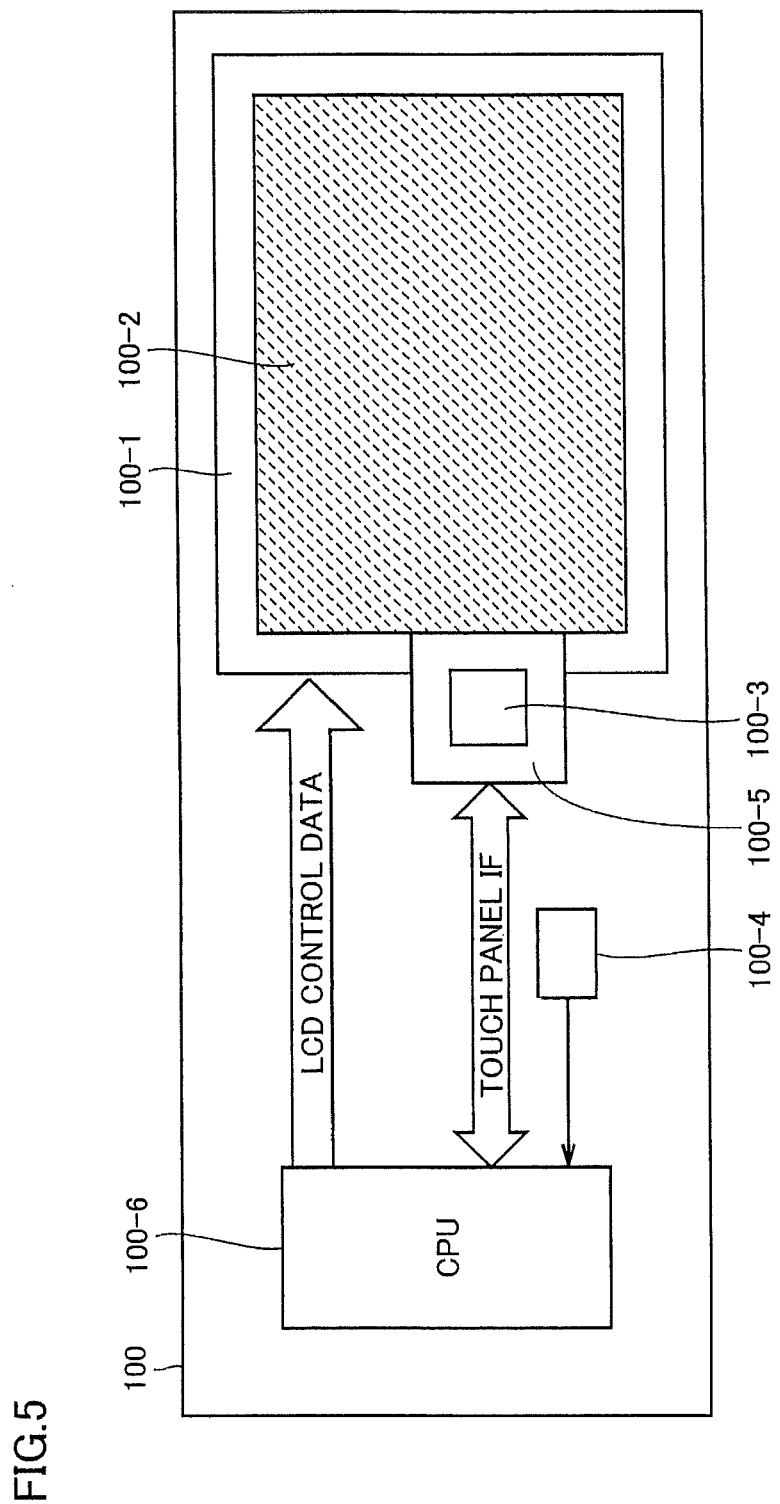
FIG. 5 is a diagram for illustrating a configuration of an operation panel of the multi function machine in FIG. 1.

FIG. 5 is a diagram for illustrating a detailed configuration of operation panel 100. Referring further to FIG. 5, in operation panel 100, display 100-1 and touch sensor 100-2 laid on the front surface of display 100-1 implement the touch panel. In operation panel 100, the touch panel and FPC 100-5 on which microcomputer 100-3 for touch panel is mounted are implemented as an integrated module.

Operation panel 100 is provided with three-axis sensor 100-4 for detecting a direction of holding of operation panel 100. Three-axis sensor 100-4 detects a direction of holding of operation panel 100 by detecting acceleration in each of three axes different from one another. Namely, as shown in FIG. 3(A) and FIG. 3(B), when operation panel 100 is rotated, three-axis sensor 100-4 can detect an angle of rotation of a housing of operation panel 100.

In operation panel 100, display 100-1, FPC 100-5, and three-axis sensor 100-4 are each connected to CPU 100-6 for controlling the operation panel. CPU 100-6 controls drive of display 100-1, processes information input to touch sensor 100-2, and processes detected output from three-axis sensor 100-4. Thus, CPU 100-6 controls display contents on display 100-1, obtains information input to touch sensor 100-2, and obtains an angle of rotation of the housing of operation panel 100.

CPU 100-6 can communicate with CPU 101 of main body 1. CPU 100-6 may control display contents on display 100-1 in accordance with information received from CPU 101. For example, when input of setting information on print processing or scan processing is requested from CPU 101, CPU 100-6 causes display 100-1 to display a screen for accepting input of the setting information. In addition, when an image obtained by image scanner 4 is received from CPU 101, CPU 100-6 causes display 100-1 to display the image or a thumbnail image thereof.

CPU 100-6 may make use of information input to touch sensor 100-2 for control of display contents on display 100-1 or may transmit the information to CPU 101. For example, when CPU 100-6 causes display 100-1 to display a screen for accepting input of setting information on print processing based on a request from CPU 101 as described above, the setting information input to the screen is transmitted to CPU 101.

CPU 100-6 may also transmit an angle of rotation of operation panel 100 detected by three-axis sensor 100-4 to CPU 101.

<Change in Display Contents on Operation Panel due to Change in Direction of Holding>

Figure 6:
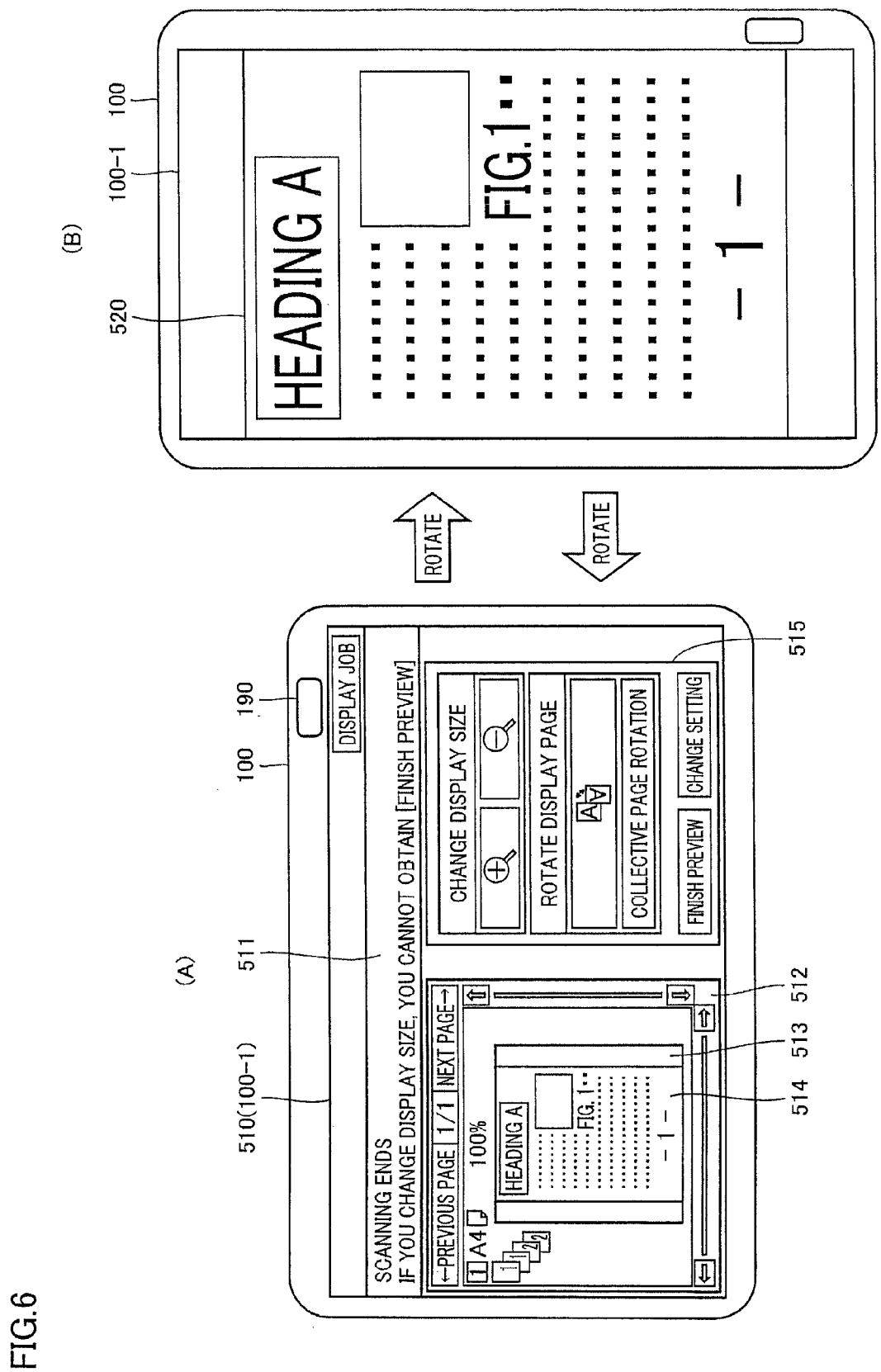
FIG. 6 is a diagram for illustrating change in display contents on a display when a direction of holding of the operation panel is changed.

FIG. 6 is a diagram for illustrating change in display contents on display 100-1 when a direction of holding of operation panel 100 is changed. It is noted that FIG. 6(A) shows a state in which operation panel 100 is held such that its longitudinal direction extends along a horizontal direction as shown in FIG. 3(A). FIG. 6(B) shows a state as shown in FIG. 3(B), in which operation panel 100 is held as being rotated by 90 degrees from the state shown in FIG. 6(A).

In multi function machine 900 in the present embodiment, display 100-1 has a rectangular display area. In the state shown in FIG. 6(A), display 100-1 is located such that the longitudinal direction of the display area extends along the horizontal direction.

Referring to FIG. 6(A), a screen 510 is displayed in a display area of display 100-1 of operation panel 100. Screen 510 is a preview screen of an image stored in HDD 104. Screen 510 includes a display field 511 for displaying a message as to operation contents, a display field 512 for displaying a preview image, and a display field 515 for displaying an operation key for inputting an instruction for screen transition or setting contents.

Display field 512 includes a display field 513 for displaying a preview image. A preview image 514 is displayed in display field 513.

FIG. 6(B) shows display contents on display 100-1 in the case where operation panel 100 is rotated by 90 degrees from the state shown in FIG. 6(A).

Display 100-1 in FIG. 6(B) displays a screen 520. Screen 520 corresponds to zoom-in display of preview image 514 displayed in preview screen 510 in FIG. 6(A). It is noted that, in multi function machine 900, when rotation of operation panel 100 is returned from the state shown in FIG. 6(B) to the state shown in FIG. 6(A), display contents on display 100-1 also return as shown in FIG. 6(A).

<Data Configuration of Display Screen>

Figure 7:
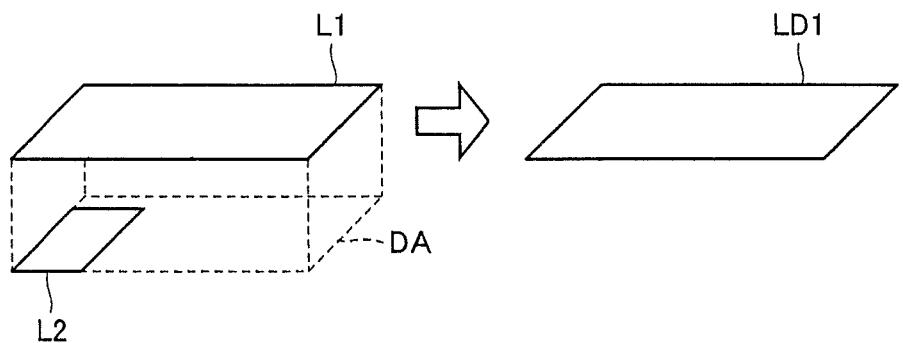
FIGS. 7 and 8 are diagrams for illustrating a configuration of data on a display screen of the display.
Figure 8:
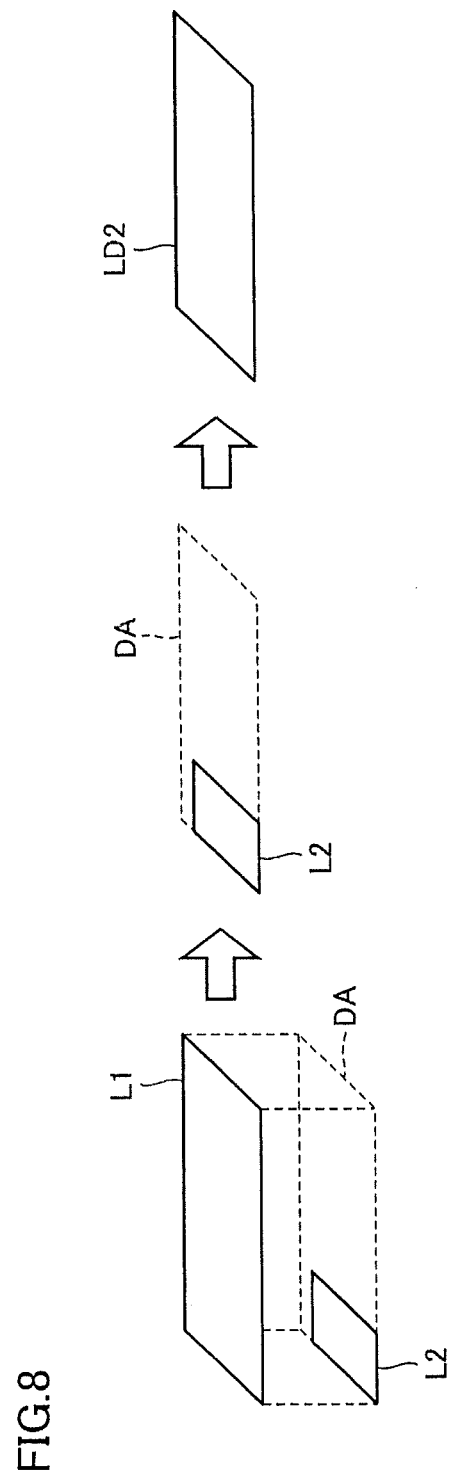

FIGS. 7 and 8 are diagrams for illustrating a configuration of data on the display screen of display 100-1. These figures show that data on the display screen is configured with data of one or more layers.

In the present embodiment, an image displayed on display 100-1 includes a specific portion. Then, as described with reference to FIG. 6(A) and FIG. 6(B), when operation panel 100 is rotated and an orientation in which it is held is changed, a specific partial image is displayed as being zoomed-in, as shown in FIG. 6(B).

A data configuration on screen 510 shown in FIG. 6(A) will be described with reference to FIG. 7. Image data on screen 510 is generated as a layer L1 and a layer L2 are superimposed on each other as shown with a layer LD1 in FIG. 7. On screen 510, image data for preview image 514 is obtained as layer L2. Then, data for a display image other than preview image 514 on screen 510 is generated as layer L1. Namely, CPU 100-6 generates data for layer L2 based on an image read from HDD 104 or image scanner 4 and generates data for layer L1 in accordance with a state of multi function machine 900. Then, CPU 100-6 combines these pieces of data with each other to generate data for layer LD1 and causes display 100-1 to display the same.

Generation of image data on screen 520 in FIG. 6(B) will now be described with reference to FIG. 8. FIG. 8 shows that an image for layer L2 is extracted from the image of layer L1 and layer L2 and the image of layer L2 is zoomed-in so that an image of a layer LD2 is generated.

When operation panel 100 is rotated from FIG. 6(A) to FIG. 6(B) as shown, CPU 100-6 extracts layer L2, which is a layer corresponding to a specific portion, from combination of layer L1 and layer L2. Then, CPU 100-6 rotates the image of layer L2 by a corresponding angle (90 degrees in the example shown from FIG. 6(A) to FIG. 6(B)) so as to correspond to the angle of rotation of operation panel 100, thereafter zooms in the image, and newly generates layer LD2. Magnification for zoom-in can be, for example, maximum magnification allowing display in a display area of display 100-1 without change in aspect ratio after rotation of layer L2.

Figure 9:
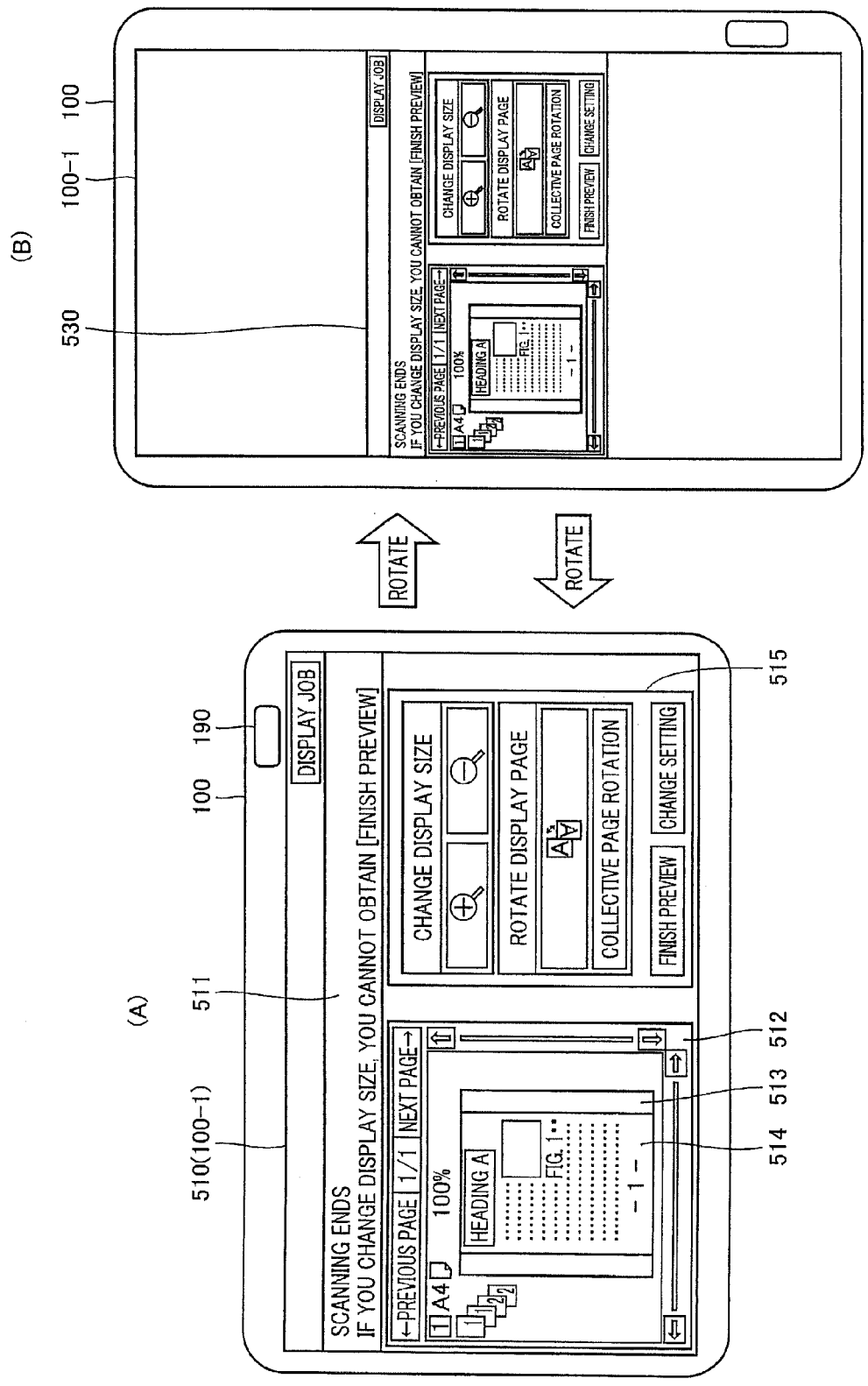
FIG. 9 is a diagram for illustrating display contents on the operation panel in a comparative example of the multi function machine in the present embodiment.

FIG. 9 is a diagram for illustrating a manner of display on operation panel 100 in a comparative example of multi function machine 900 in the present embodiment.

FIG. 9(A) shows a display state the same as that of display 100-1 in the state of operation panel 100 shown in FIG. 6(A). FIG. 9(B) shows a state in which operation panel 100 is rotated by 90 degrees in the operational display device in the comparative example.

In FIG. 9(B), on display 100-1, screen 510 which has been displayed on display 100-1 in FIG. 9(A) is displayed as a screen 530, as being rotated by the same angle as the angle of rotation of operation panel 100 and zoomed-out.

Screen 530 maintains the same aspect ratio as that of screen 510. Then, screen 530 is displayed at a largest size at which its entirety can be displayed in display 100-1 in FIG. 9(B), that is, as being zoomed out with respect to screen 510 in FIG. 9(A).

In screen 530 in FIG. 9(B), the preview image is also displayed as being zoomed out, and hence its contents are very difficult to view. In order to check detailed contents on the preview image, the user has to perform a troublesome operation such as a button operation or movement of a position to be focused on.

On the other hand, according to display control in the present embodiment described with reference to FIGS. 6 to 8, the user can check a preview image of which contents should be checked, without performing the troublesome operation described above, even though the operation panel is rotated.

<Rotational Display Processing>

Figure 10:
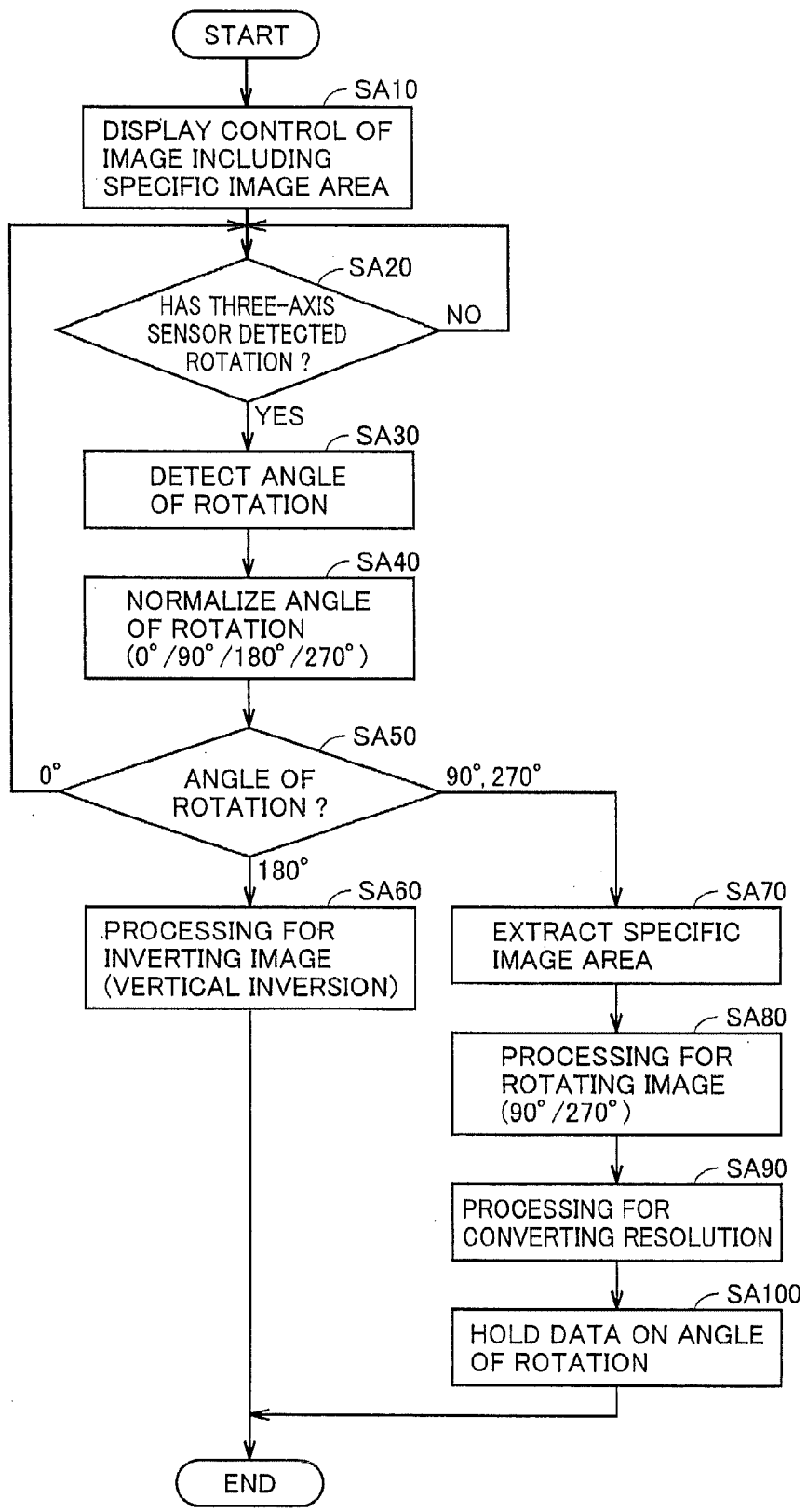
FIG. 10 is a flowchart of rotational display processing.

FIG. 10 is a flowchart of processing for rotating and displaying a display image (rotational display processing) on display 100-1 when an orientation of holding of operation panel 100 is rotated, as described with reference to FIG. 6.

Referring to FIG. 10, initially in step SA10, CPU 100-6 causes display 100-1 to display an image including a specific image area, and the process proceeds to step SA20. Here, the specific image area corresponds to a specific portion described with reference to FIGS. 6 and 8. In addition, contents displayed in step SA10 are in accordance with a state of operation of multi function machine 900. CPU 100-6 may also determine contents of an image to be displayed on display 100-1 in response to an instruction from CPU 101.

Then, in step SA20, CPU 100-6 determines whether or not three-axis sensor 100-4 has detected rotation of operation panel 100 as described with reference to FIG. 3(A) and FIG. 3(B), and when it determines that rotation has been detected, the process proceeds to step SA30.

In step SA30, CPU 100-6 obtains an angle of rotation from three-axis sensor 100-4, and the process proceeds to step SA40.

In step SA40, CPU 100-6 normalizes the angle of rotation obtained in step SA30, and the process proceeds to step SA50.

It is noted that the angle of rotation detected in step SA30 is converted to any of 0 degree, 90 degrees, 180 degrees, and 270 degrees as a result of normalization in step SA40. For example, when the angle of rotation is not smaller than 315 degrees and smaller than 359 degrees or not smaller than 0 degree and smaller than 45 degrees, an angle after normalization is assumed as 0 degree. Alternatively, when the angle of rotation is not smaller than 45 degrees and smaller than 135 degrees, an angle after normalization is assumed as 90 degrees. When the detected angle of rotation is not smaller than 135 degrees and smaller than 225 degrees, an angle of rotation after normalization is assumed as 180 degrees. When the detected angle of rotation is not smaller than 225 degrees and smaller than 315 degrees, an angle after normalization is assumed as 270 degrees.

In step SA50, CPU 100-6 performs processing in accordance with the angle of rotation obtained as a result of normalization in step SA40. When the angle of rotation is 0 degree, the process returns to step SA20. When the angle of rotation is 90 degrees or 270 degrees, the process proceeds to step SA70. When the angle of rotation is 180 degrees, the process proceeds to step SA60.

In step SA60, CPU 100-6 updates display contents on display 100-1 such that an image displayed on display 100-1 is vertically inverted, and the process ends.

On the other hand, in step SA70, CPU 100-6 extracts a specific image area from the image which has been displayed on display 100-1, and the process proceeds to step SA80.

In step SA80, CPU 100-6 rotates the image of the specific image area extracted in step SA70 by an angle obtained as a result of normalization in step SA40, and the process proceeds to step SA90.

In step SA90, CPU 100-6 causes display 100-1 to display the image subjected to rotation processing in step SA80 (the image of the specific image area) as being zoomed-in such that maximum display thereof in the display area of display 100-1 without change in aspect ratio is realized, and the process proceeds to step SA100.

In step SA100, CPU 100-6 causes the memory of microcomputer 100-3 to store the angle of rotation at the time of the rotation processing in step SA80, and the process ends.

In the rotational display processing described above, extraction of the specific image area in step SA70 corresponds to extraction of a layer including a specific portion (layer L2) from a plurality of layers (layers L1, L2) as shown in FIG. 8.

In addition, rotation of an image of a specific image area in step SA80 and zoom-in of the image of the specific image area in step SA90 correspond to generation of layer LD2 through rotation and zoom-in of layer L2, as described with reference to FIG. 8.

<Rotation Cancellation Display Processing>

Figure 11:
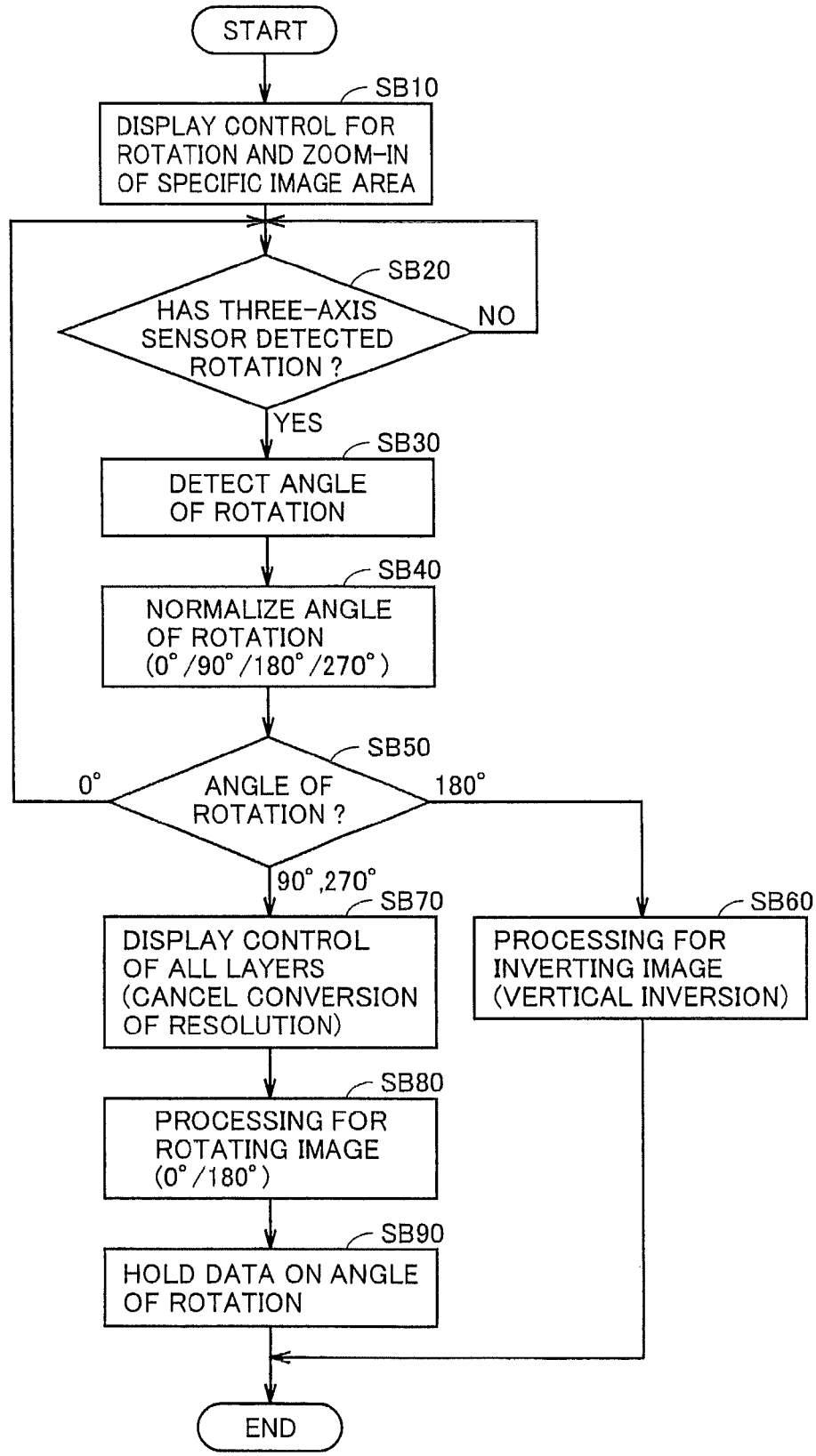
FIG. 11 is a flowchart of rotation cancellation display processing.

FIG. 11 is a flowchart of processing for canceling change in display contents on display 100-1 (rotation cancellation display processing) involved with rotation of operation panel 100 as described with reference to FIG. 10.

Referring to FIG. 11, display control for rotation and zoom-in of a specific image area in step SB10 corresponds to rotational display control described with reference to FIG. 10.

Thereafter, CPU 100-6 determines in step SB20 whether or not three-axis sensor 100-4 has detected rotation of operation panel 100, and when it determines that rotation has been detected, the process proceeds to step SB30.

In step SB30, CPU 100-6 obtains a detected angle of rotation from three-axis sensor 100-4, and the process proceeds to step SB40.

In step SB40, CPU 100-6 normalizes the angle of rotation detected by three-axis sensor 100-4 as in step SA40 (see FIG. 10), and the process proceeds to step SB50.

In step SB50, CPU 100-6 determines a path of processing in accordance with the angle of rotation normalized in step SB40. Specifically, when the angle of rotation is 0 degree, the process returns to step SB20, when the angle of rotation is 90 degrees or 270 degrees, the process proceeds to step SB70, and when the angle of rotation is 180 degrees, the process proceeds to step SB60.

In step SB60, CPU 100-6 updates the display screen on display 100-1 so as to vertically invert the display screen as in step SA60 (see FIG. 10), and the process ends.

On the other hand, in step SB70, CPU 100-6 reads image data of all layers (layer LD1 in FIG. 7) displayed in step SA10 (see FIG. 10) as a display object, and the process proceeds to step SB80.

In step SB80, CPU 100-6 performs processing for rotating the image read in step SB70, and the process proceeds to step SB90.

The rotation processing in step SB80 is performed based on the total sum of angles of rotation of operation panel 100 so far. CPU 100-6 obtains the total sum of the angles of rotation of operation panel 100 by calculating the sum of the angle of rotation stored in step SA100 (see FIG. 10) and the angle of rotation obtained in step SB40 in the present rotation cancellation display processing. Then, when the total sum of the angles of rotation is 0 degree or 360 degrees, CPU 100-6 causes display 100-1 to display the image displayed in step SA10 without rotating the same. On the other hand, when the total sum above is 180 degrees or 540 degrees, CPU 100-6 rotates the image initially displayed in step SA10 by 180 degrees (vertically inverts the image) and causes display 100-1 to display the resultant image.

Then, in step SB90, CPU 100-6 causes the memory of microcomputer 100-3 to store the total sum of the angles of rotation obtained in step SB80, and the process ends.

According to the rotation cancellation display processing described above with reference to FIG. 11, when operation panel 100 is rotated by 90 degrees and held as in FIG. 6(B) from FIG. 6(A) and thereafter again returned by being rotated by 90 degrees to the state shown in FIG. 6(A), display on display 100-1 is returned to the entire operation screen (screen 510) including the specific portion as shown in FIG. 6(A).

<First Variation>

Though operation panel 100 has been fixed to multi function machine 900 in multi function machine 900 in the present embodiment described above, it may be attachable to and removable from main body 1 of multi function machine 900.

Figure 12:
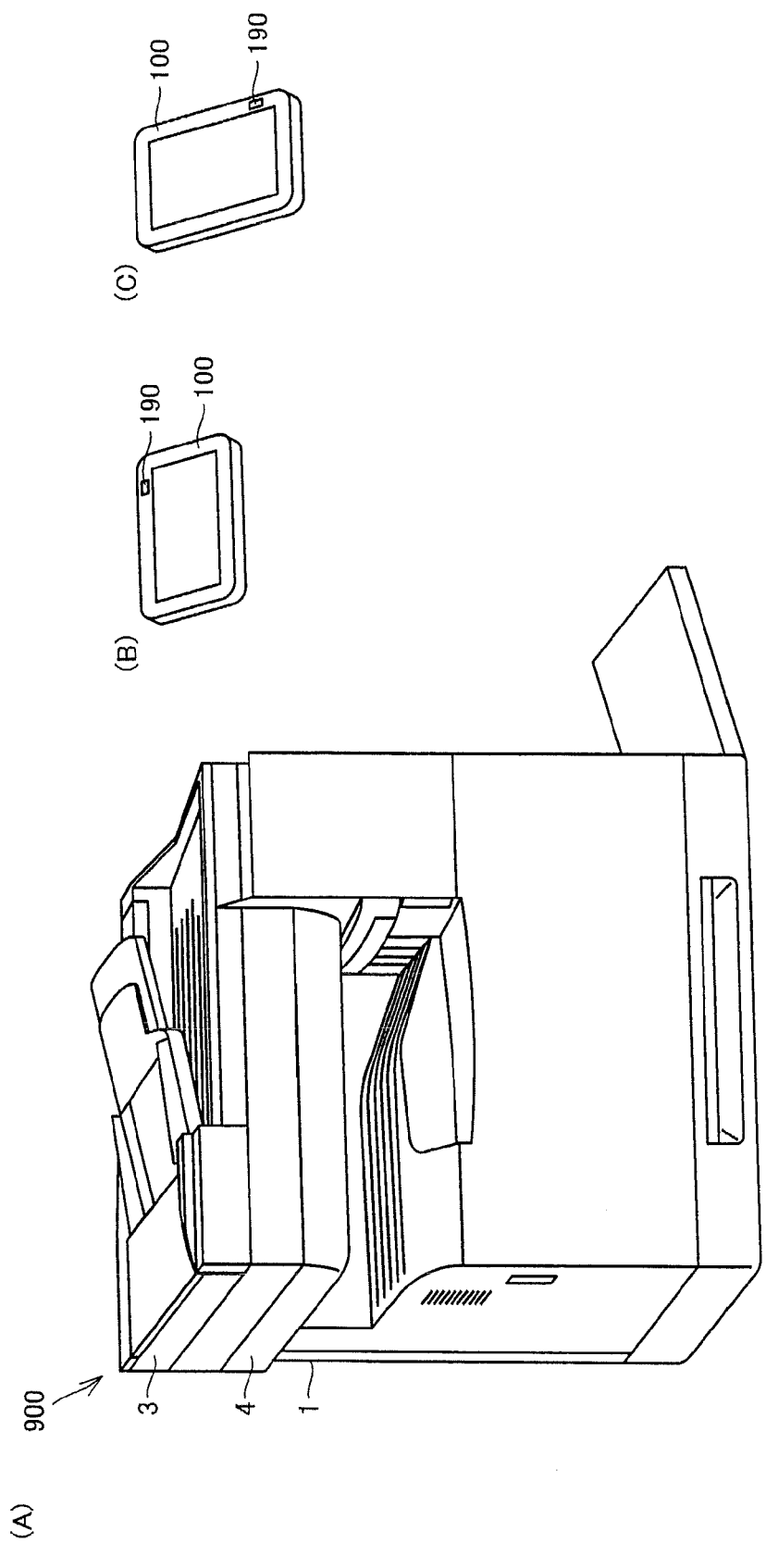
FIG. 12 is a diagram schematically showing a configuration in a variation of the multi function machine.

FIG. 12 is a diagram schematically showing a configuration of multi function machine 900 in the present variation.

FIG. 12(A) shows main body 1 of multi function machine 900. Then, FIG. 12(B) and (C) shows operation panel 100 removed from main body 1 of multi function machine 900. Operation panel 100 removed from main body 1 can also be in a state shown in FIG. 12(B), or also can be in a state shown in FIG. 12(C) as being rotated by 90 degrees with respect to the former state. In addition, since operation panel 100 is not fixed to main body 1 of multi function machine 900, it can freely be rotated also by any angle other than 90 degrees.

Figure 13:
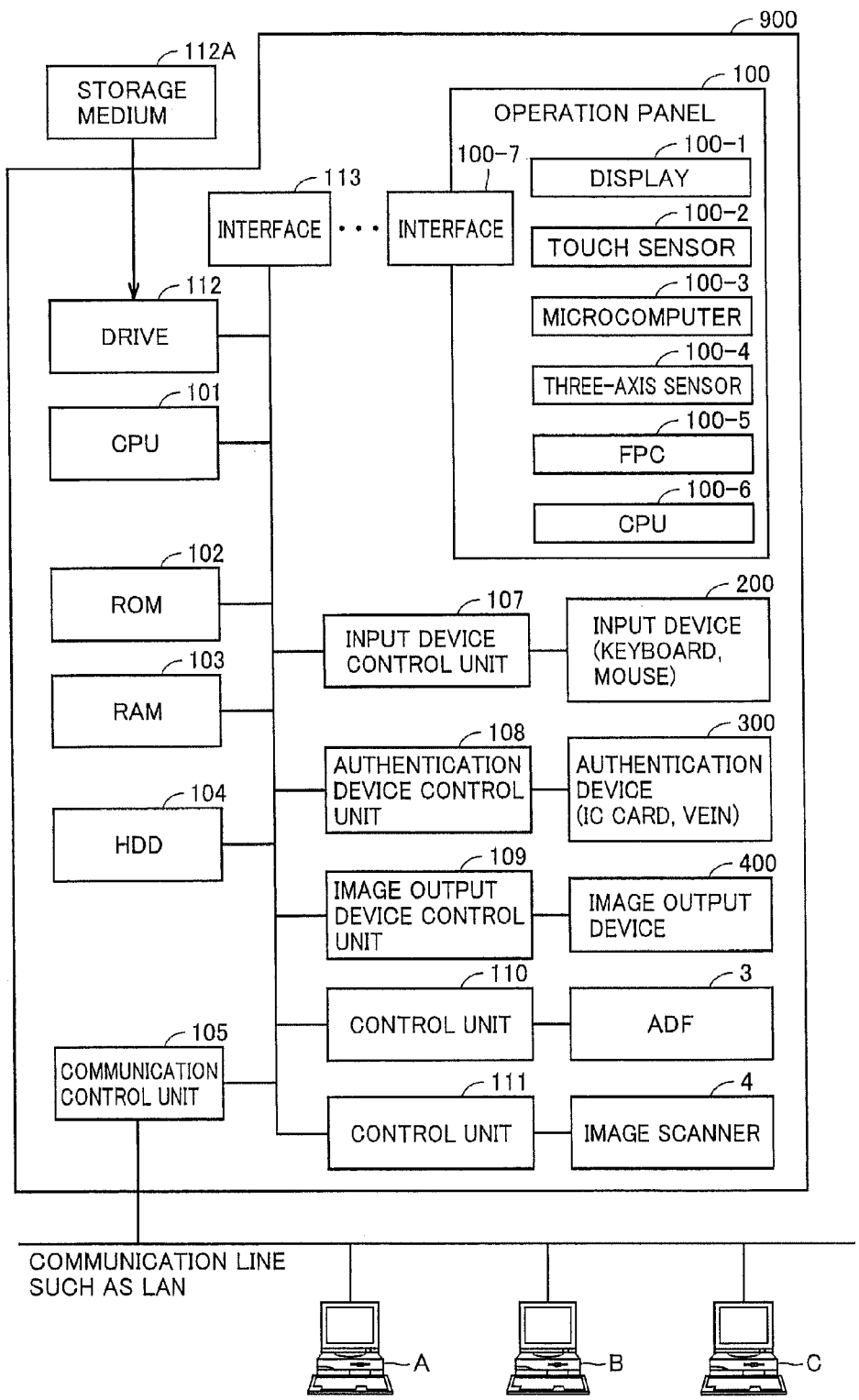
FIG. 13 is a control block diagram of the multi function machine in FIG. 12.

FIG. 13 is a control block diagram of multi function machine 900 shown in FIG. 12. Referring to FIG. 13, operation panel 100 in the present variation further includes an interface 100-7 in addition to operation panel 100 described with reference to FIG. 4. Moreover, an interface 113 is also provided on a main body side of multi function machine 900. In the present variation, operation panel 100 communicates with main body 1 of multi function machine 900 through interface 100-7. Each element in main body 1 communicates with operation panel 100 through interface 113.

Then, CPU 100-6 of operation panel 100 in the present variation performs the processing described with reference to FIGS. 10 and 11 (the rotational display processing and the rotation cancellation display processing). Thus, as described with reference to FIG. 12(B) and FIG. 12(C), when operation panel 100 removed from main body 1 of multi function machine 900 is rotated as well, display contents on display 100-1 are updated in accordance with an angle of rotation thereof, as described with reference to FIG. 6(A) and FIG. 6(B).

In the present variation, when multi function machine 900 implements an operational display device, operation panel 100 functions as a device for displaying operation contents of multi function machine 900. Alternatively, when operation panel 100 implements an operational display device, operation contents of operation panel 100 itself are displayed on operation panel 100.

<Second Variation>

Though an image extracted as a specific portion and displayed as being zoomed-in has been image data stored in HDD 104 in the present embodiment described above, an object extracted and displayed as being zoomed-in as above is not limited to such an image.

Figure 14:
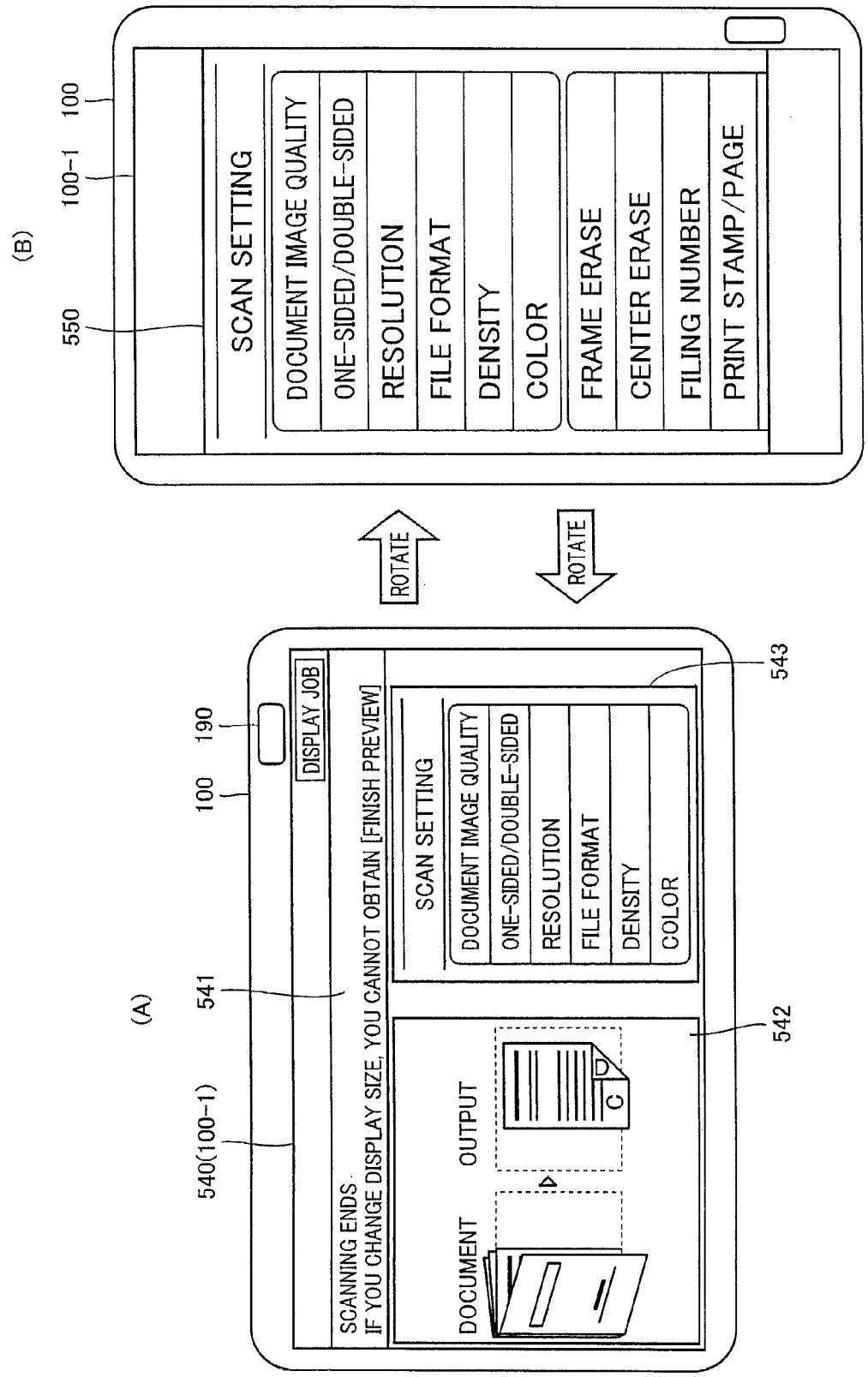
FIGS. 14 to 16 are diagrams for illustrating display contents on a display in variations of the multi function machine.

In the present variation, an image to be operated for inputting an operation instruction to an operational display device is set as an image extracted and displayed as being zoomed-in as such. FIG. 14 is a diagram for illustrating display contents on display 100-1 of operation panel 100 in the present variation.

Referring first to FIG. 14(A), screen 540 is displayed on display 100-1 of operation panel 100. Screen 540 includes display field 541 for displaying a message describing operation contents to a user, display field 542 representing an image showing guidance for operation contents, and display field 543 listing software buttons for inputting operation information.

In display field 543, software buttons corresponding to respective setting items for having image scanner 4 scan an image are listed. The setting items include document image quality, one-sided/double-sided, resolution, file format, density, and color. It is noted that multi function machine 900 is configured such that setting for more items can be made in connection with scan setting. Namely, software buttons displayed in display field 543 in FIG. 14(A) show some of items which can be set in multi function machine 900. Though the software buttons are aligned vertically in display field 543, software buttons for further setting items which are not displayed at this time point can successively be displayed vertically.

In screen 540 in the present embodiment, display field 543 is defined as the specific portion. Namely, display data in screen 540 is displayed based on layer L2 in FIG. 7.

FIG. 14(B) shows such a state that operation panel 100 is rotated by 90 degrees from the state shown in FIG. 14(A).

In FIG. 14(B), display 100-1 of operation panel 100 displays a screen 550. Screen 550 displays as being zoomed-in, a list of software buttons which have been displayed in display field 543 in FIG. 14(A). It is noted that screen 550 in FIG. 14(B) displays software buttons more than those which have been displayed in display field 543 as a display area for list display of software buttons is made greater than screen 540. In addition, in screen 550, software buttons are displayed in a vertically scrollable manner.

<Third Variation>

In the present embodiment described above, when an orientation in which operation panel 100 is held is changed, an image of a specific portion (an image of a specific image area) is extracted from an image displayed on display 100-1 and the orientation of the image is rotated in accordance with the resultant orientation of operation panel 100 and the image is displayed as being zoomed-in (see FIG. 6(A) and FIG. 6(B)).

It is noted that rotation of the image of the specific portion may selectively be carried out in accordance with characteristics of the image.

A longitudinal direction of the image of the specific portion displayed on screen 510 in FIG. 6(A) (preview image 514) extends in a direction crossing the longitudinal direction of display 100-1 of operation panel 100. Preview image 514 is a vertically oriented image and a display area of display 100-1 is horizontally oriented.

In the state shown in FIG. 6(B), the display area of display 100-1 is vertically oriented. Namely, in operation panel 100 after a direction of holding is changed, the longitudinal direction of display 100-1 is a direction along the longitudinal direction of preview image 514 in an erected state.

Thus, when the longitudinal direction of display 100-1 in operation panel 100 after the direction of holding is changed extends along the longitudinal direction of the image of the specific portion being erected, the image is preferably rotated in accordance with rotation of operation panel 100.

On the other hand, when the longitudinal direction of display 100-1 of operation panel 100 after the direction of holding is changed crosses the longitudinal direction of the image of the specific portion being erected, control for not rotating the image in spite of rotation of operation panel 100 may also be possible.

Figure 15:
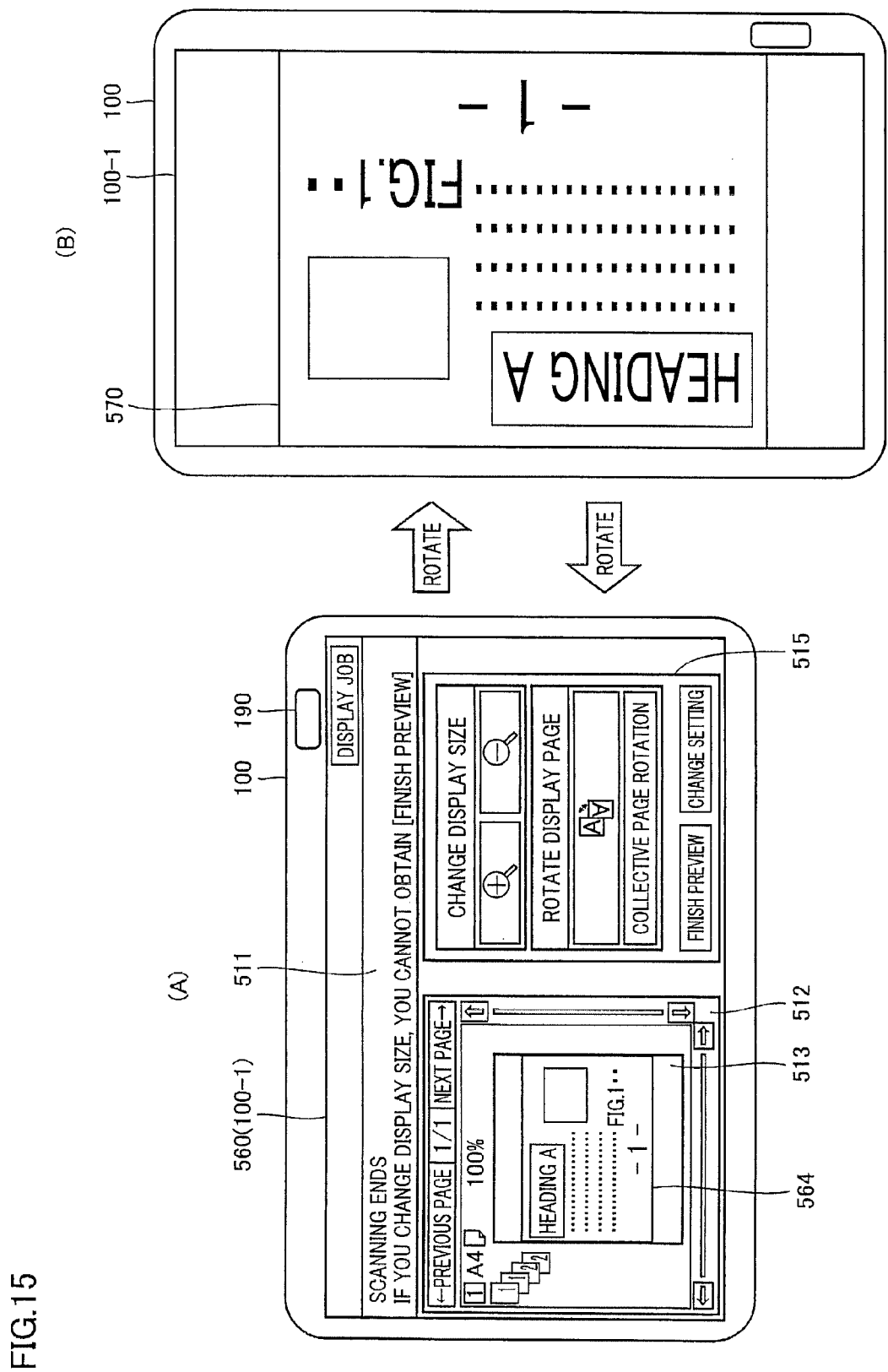

FIG. 15 is a diagram for illustrating change in display contents involved with rotation of operation panel 100, on display 100-1 of multi function machine 900 in the present variation.

FIG. 15(A) shows a screen 560 on display 100-1, resulting from change of preview image 514 in FIG. 6(A) to a preview image 564. Screen 560 includes display field 511 for displaying a message for operation, display field 512 for displaying a preview screen, and display field 515 for displaying an operation button. Display field 513 in display field 512 displays preview image 564. Preview image 564 is an image horizontally oriented in an erected state, that is, an image of which longitudinal direction extends along a lateral direction.

FIG. 15(B) shows display contents on display 100-1 when operation panel 100 is rotated by 90 degrees from the state shown in FIG. 15(A).

In the state shown in FIG. 15(B), the display area of display 100-1 is vertically oriented. Namely, the longitudinal direction in the state where preview image 564 displayed on screen 560 is erected is different from the longitudinal direction of display 100-1 of rotated operation panel 100. Thus, in FIG. 15(B), display is such that the longitudinal direction of the preview image in the erected state extends along the longitudinal direction of display 100-1.

Namely, in the present variation, when an orientation in which operation panel 100 is held is changed by rotating, whether or not to rotate an image of a specific portion on rotated operation panel 100 is determined based on relation between the longitudinal direction of the display area of display 100-1 in the resultant orientation and the longitudinal direction of the image of the specific portion. Specifically, when the longitudinal direction of display 100-1 of rotated operation panel 100 does not extend along the longitudinal direction of the image of the specific portion displayed on display 100-1 before rotation, the image of the specific portion is displayed on rotated operation panel 100 as being zoomed-in without being rotated. On the other hand, in a case otherwise, the image of the specific portion is rotated on rotated operation panel 100 and then displayed as being zoomed-in (see FIGS. 6(A) and (B)).

<Fourth Variation>

In the present embodiment and each variation described above, the number of specific portions included in the screen displayed on display 100-1 was "1". It is noted that, in the case where an image displayed on the screen includes images of a plurality of specific portions, an image extracted as an image to be rotated and zoomed-in at the time of rotation of operation panel 100 as described with reference to FIG. 6 can be selected from the plurality of specific portions.

Figure 16:
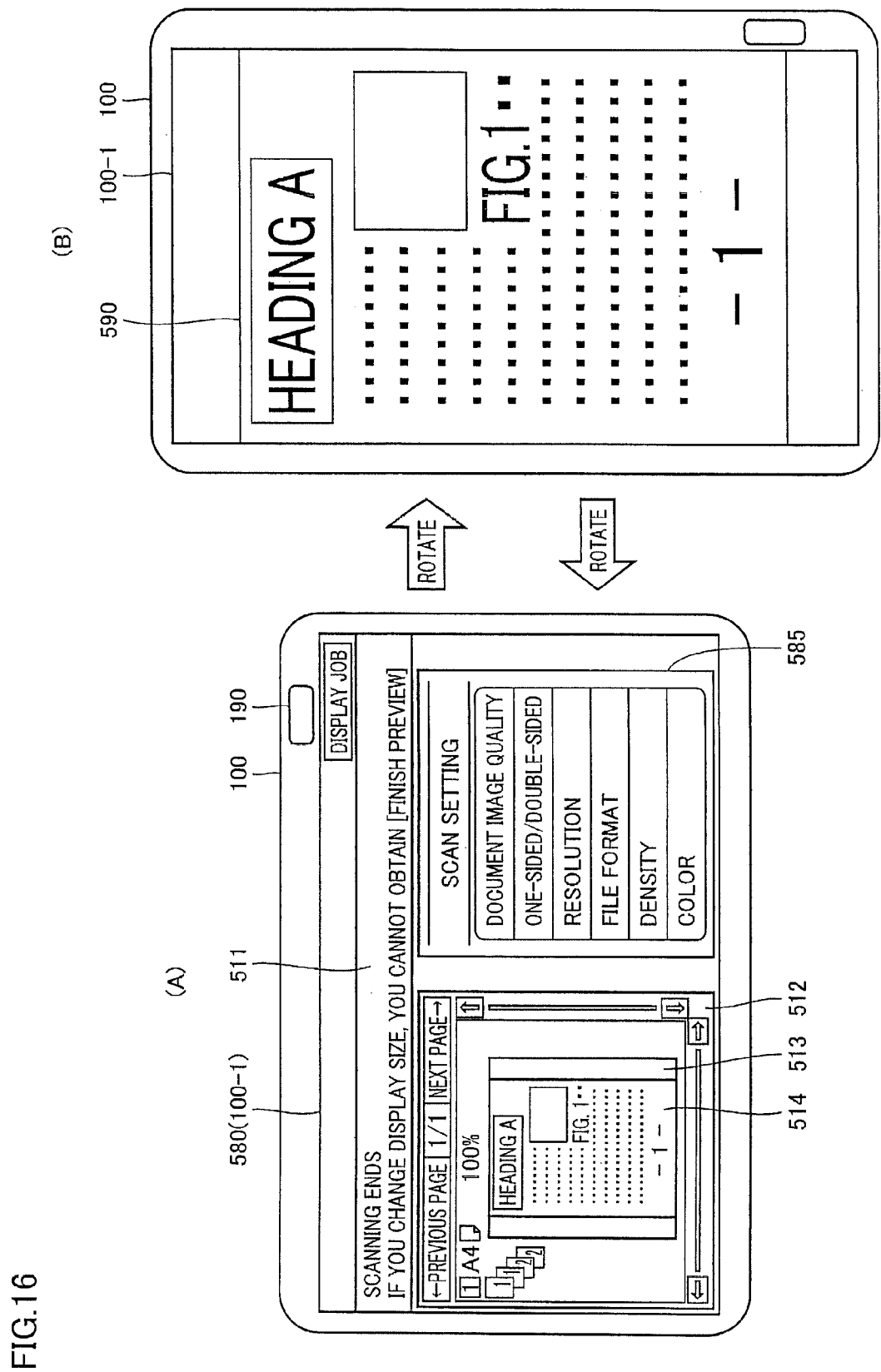

FIG. 16 is a diagram for illustrating change in display contents on display 100-1 involved with rotation of operation panel 100 in the present variation.

FIG. 16(A) shows operation panel 100 in such a state that the longitudinal direction of display 100-1 extends along the lateral direction. Display 100-1 displays a screen 580. Screen 580 includes display field 511, display field 512, and a display field 585. Display field 585 shows a plurality of operation buttons of which scroll display is provided vertically as in display field 543 in FIG. 14(A).

Figure 17:
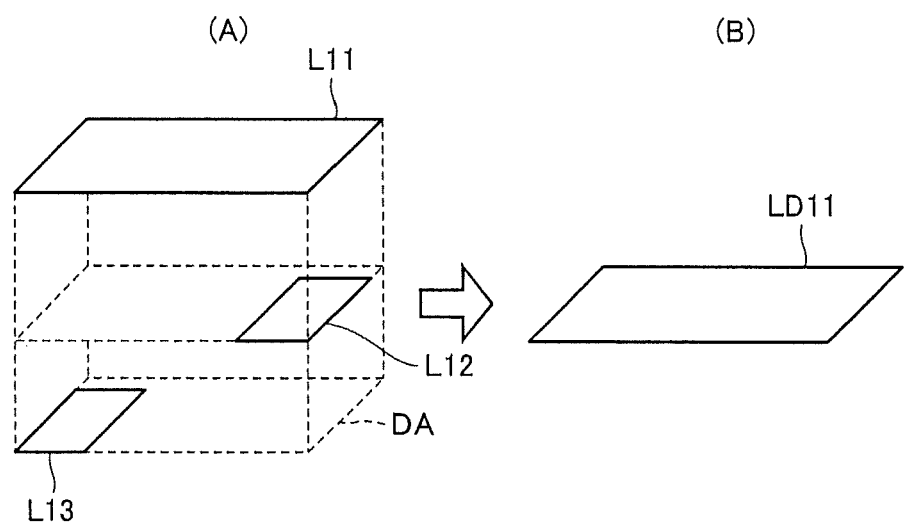
FIG. 17 is a diagram schematically showing a configuration of a screen in FIG. 16(A).

In screen 580, preview image 514 and display field 585 implement specific portions. A configuration of screen 580 will be described with reference to FIG. 17. FIG. 17 is a diagram schematically showing the configuration of screen 580 in FIG. 16(A).

As shown in FIG. 17(A), screen 580 is a screen realized by a combination of a layer L12 configuring display data corresponding to display field 585, a layer L13 configuring image data of preview image 514, and a layer L11 configuring display data of a portion other than those. As shown in FIG. 17(B), a layer LD11 generated as a result of a combination of layers L11 to L13 in FIG. 17(A) corresponds to image data configuring screen 580.

In the present variation, as an image to be displayed as being zoomed-in and rotated with rotation of operation panel 100 is specified, a layer selected at the time of rotation of operation panel 100 is specified.

Figure 18:
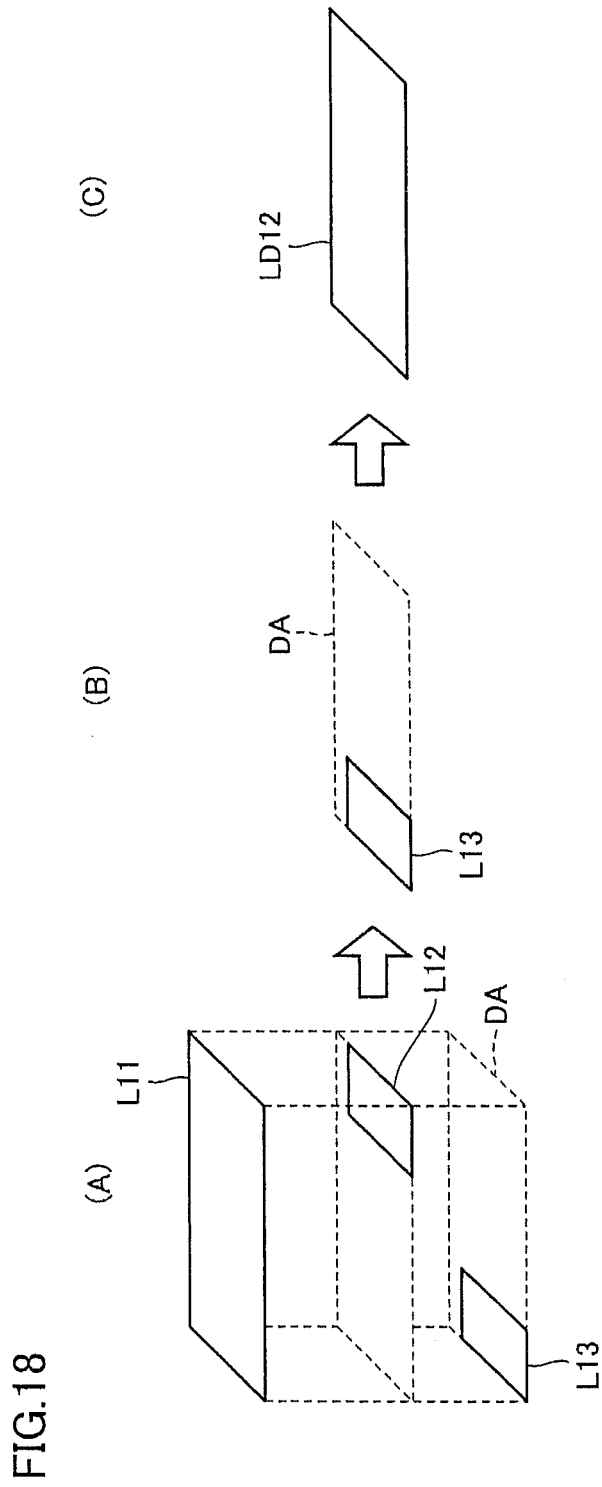
FIG. 18 is a diagram for illustrating generation of image data involved with rotation of the operation panel.

FIG. 18 is a diagram for illustrating generation of image data involved with rotation of operation panel 100.

When rotation of operation panel 100 is detected, as shown in FIG. 18(B), a layer specified as above is selected from layers L11 to L13 shown in FIG. 18(A). FIG. 18(B) shows an example in which layer L13 is specified as a selected layer. Then, an image of the layer thus selected is displayed on display 100-1 as a layer LD12 as shown in FIG. 18(C) as being rotated and zoomed-in as described with reference to FIG. 8.

Display contents on display 100-1 of operation panel 100 rotated by 90 degrees from the state shown in FIG. 16(A) will be described with reference to FIG. 16 (B).

In FIG. 16(B), display 100-1 displays a screen 590. Screen 590 is a screen displaying an image resulting from rotation of preview image 514 in FIG. 16(A) by 90 degrees and zoom-in thereof.

Namely, FIG. 16 shows such a state that preview image 514 among a plurality of specific images (preview image 514 and display field 585) on screen 580 is selected as an image to be displayed as being zoomed-in and rotated.

Figure 19:
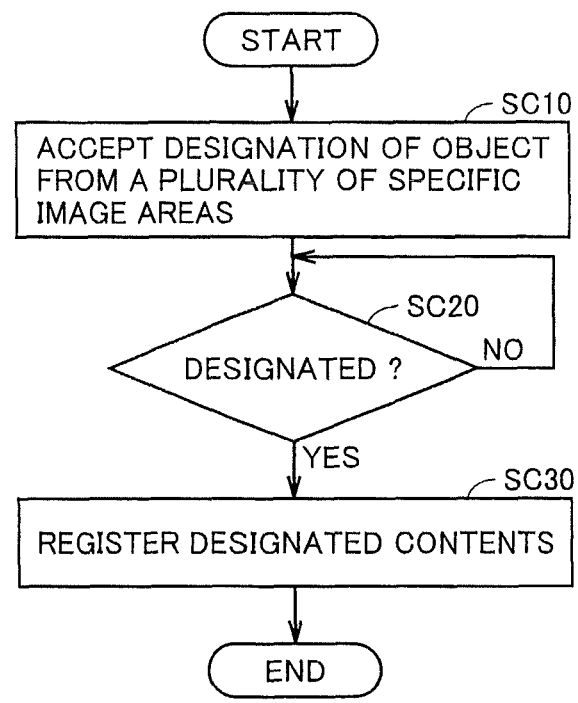
FIG. 19 is a flowchart of processing for accepting selection of an image from among a plurality of specific images, which is to be displayed as being zoomed-in and rotated.

FIG. 19 is a flowchart of processing for accepting selection of an image from among a plurality of specific images as described with reference to FIG. 16, which is to be displayed as being zoomed-in and rotated.

Referring to FIG. 19, in step SC10, CPU 100-6 accepts designation of a target area for zoom-in or the like when a prescribed operation is performed on touch sensor 100-2 or when an instruction from CPU 101 is received.

Figure 20:
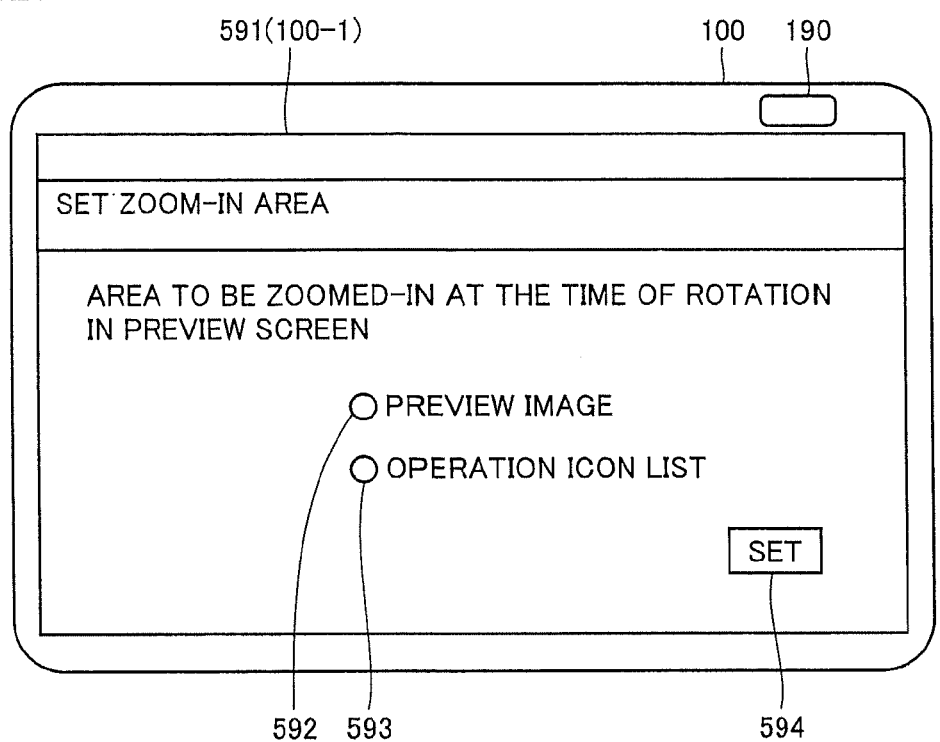
FIG. 20 is a diagram showing one example of a setting screen in the processing in FIG. 19.

Here, CPU 100-6 causes display 100-1 to display, for example, a screen as shown in FIG. 20.

Referring to FIG. 20, display 100-1 displays a screen 591. On screen 591, a plurality of specific images included in screen 580 (see FIG. 16(A)) are listed as a "preview image" and an "operation icon list." Display field 592 is a field operated for selecting a "preview image". Display field 593 is a field operated for selecting an "operation icon list."

The user inputs designation of a target area to be zoomed-in or the like by operating any of these display fields and thereafter operating a set button 594.

Then, in step SC20, CPU 100-6 determines whether or not an operation for designating an image to be rotated and zoomed-in (an image of a specific image area) from images of a plurality of specific portions, and when it determines that such an operation has been performed, the process proceeds to step SC30. It is noted that one example of such an operation is an operation of display field 592 or display field 593 on screen 591 in FIG. 20 and an operation of set button 594.

Then, in step SC30, CPU 100-6 causes contents of accepted designation in step SC20 to be registered in a storage area of microcomputer 100-3, and the process ends.

In the present variation described above, in step SA70 of the rotational display processing (see FIG. 10), an area corresponding to the image designated as above is extracted. Such extraction of an area corresponds to contents described with reference to FIGS. 18(A) and (B).

<Other Variations>

In the embodiment and the variations thereof described above, a screen displayed on display 100-1 is configured with a plurality of layers, and data of an image of a specific portion (an image of a specific image area) is configured such that a layer therefor is separate from other layers of the plurality of layers described above.

It is noted that a configuration of image data of an image displayed on an operational display device is not limited to such a configuration. For example, an image based on a document described in a markup language or an image displayed based on bit map data or vector data may be applicable. In addition, with regard to a method of designating a specific portion in these images as well, a well-known method for designating a part in an image, for example, designation with a tag in description with a markup language, may be adopted.

Furthermore, in the embodiment and the variations thereof described above, with reference to FIG. 6 and the like, a case in which, in the rotational display processing (see FIG. 10), display 100-1 is rotated from a horizontally oriented state to a vertically oriented state, and in the rotation cancellation display processing (see FIG. 11), display 100-1 is rotated from the vertically oriented state to the horizontally oriented state has been exemplified. A manner of rotation of operation panel 100 to which the rotational display processing and the rotation cancellation display processing are adapted is not limited as such. For example, a case that, in the rotational display processing, display 100-1 is rotated from the vertically oriented state to the horizontally oriented state, and in the rotation cancellation display processing, display 100-1 is rotated from the horizontally oriented state to the vertically oriented state may also be encompassed.

According to the present embodiment, when an orientation in which a display portion is held is changed from a first orientation to a second orientation, an image of a specific portion displayed in the display portion is rotated in accordance with the orientation of holding and then displayed as being zoomed-in.

Thus, when a user changes the orientation in which the display portion is held, the user can view the zoomed-in image without performing a troublesome operation for zoom-in display of the image of the specific portion.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An operational display device, comprising:
 a display portion for displaying an image based on image data including a specific portion;
 a detection portion for detecting an orientation in which said display portion is held; and
 a display control unit for controlling a manner of display on said display portion,
 said display control unit causing an image of said specific portion to be rotated and displayed as being zoomed-in in accordance with an orientation of holding of said display portion when the orientation in which said display portion is held is changed from a first orientation to a second orientation,
 wherein a longitudinal direction of a display area on said display portion is changed when the orientation in which said display portion is held is changed from said first orientation to said second orientation,
 said display control unit determines whether the longitudinal direction of said display area and a longitudinal direction of the image of said specific portion cross each other when said display portion is in said first orientation,
 when said display control unit determines that the longitudinal direction of said display area and the longitudinal direction of the image of said specific portion cross each other, said display control unit causes the image of said specific portion to be rotated and displayed as being zoomed-in in accordance with the orientation of holding of said display portion as the orientation in which said display portion is held is changed from the first orientation to the second orientation, and
 when said display control unit determines that the longitudinal direction of said display area and the longitudinal direction of the image of said specific portion do not cross each other, said display control unit causes the image of said specific portion to be displayed as being zoomed-in without rotating the image as the orientation in which said display portion is held is changed from the first orientation to the second orientation.

2. The operational display device according to claim 1, further comprising an image processing portion for processing the image data, wherein
 said specific portion is a portion displaying a preview screen of the image data processed by said image processing portion.

3. The operational display device according to claim 1, wherein
 said specific portion is a portion wherein an image is displayed for accepting an instruction for an operation on said operational display device.

4. The operational display device according to claim 3, wherein
 said portion wherein the image is displayed for accepting an instruction for an operation is a portion wherein a list of a plurality of images for accepting instructions for operation is displayed in a scrollable manner.

5. The operational display device according to claim 4, wherein said display control unit increases the number of the images for accepting an instruction displayed in said list without scrolling by enlarging the image of the portion to display an image for accepting an instruction for an operation.

6. The operational display device according to claim 1, wherein
 said display control unit causes said display portion to display the image data including a plurality of specific portions,
 said operational display device further comprises an input portion for accepting selection of one said specific portion from among said plurality of specific portions, and
 said display control unit provides zoom-in display of an image of selected said specific portion when the orientation in which said display portion is held is changed from said first orientation to said second orientation.

7. The operational display device according to claim 1, wherein
 said display control unit cancels zoom-in display of said specific portion when the orientation in which said display portion is held is changed from said second orientation to said first orientation.

8. The operational display device according to claim 1, wherein
 said display control unit causes said display portion to provide maximum display of the image of said specific portion without changing an aspect ratio when the orientation in which said display portion is held is changed from said first orientation to said second orientation.

9. The operational display device according to claim 1, further comprising an image processing apparatus that communicates with said display device, wherein said image processing portion is a component of said image processing apparatus, and wherein said instruction is an instruction for controlling an operation of said image processing apparatus.

10. A method of controlling an operational display device performed by a computer of the operational display device including a display portion for displaying an image based on image data including a specific portion, comprising:
  detecting an orientation in which said display portion is held; and
  rotating and displaying an image of said specific portion as being zoomed-in in accordance with an orientation of holding of said display portion when the orientation in which said display portion is held is changed from a first orientation to a second orientation,
  wherein a longitudinal direction of a display area on said display portion is changed when the orientation in which said display portion is held is changed from said first orientation to said second orientation,
  determining, by a display control unit, whether the longitudinal direction of said display area and a longitudinal direction of the image of said specific portion cross each other when said display portion is in said first orientation,
  wherein, when said display control unit determines that the longitudinal direction of said display area and the longitudinal direction of the image of said specific portion cross each other, said display control unit causes the image of said specific portion to be rotated and displayed as being zoomed-in in accordance with the orientation of holding of said display portion as the orientation in which said display portion is held is changed from the first orientation to the second orientation, and
  wherein, when said display control unit determines that the longitudinal direction of said display area and the longitudinal direction of the image of said specific portion do not cross each other, said display control unit causes the image of said specific portion to be displayed as being zoomed-in without rotating the image as the orientation in which said display portion is held is changed from the first orientation to the second orientation.

11. A non-transitory computer readable recording medium recording a program executable by a computer of an operational display device including a display portion for displaying an image based on image data including a specific portion, said program causing said computer to perform:
  detecting an orientation in which said display portion is held; and
  rotating and displaying an image of said specific portion as being zoomed-in in accordance with an orientation of holding of said display portion when the orientation in which said display portion is held is changed from a first orientation to a second orientation,
  wherein a longitudinal direction of a display area on said display portion is changed when the orientation in which said display portion is held is changed from said first orientation to said second orientation;
  determining whether the longitudinal direction of said display area and a longitudinal direction of the image of said specific portion cross each other when said display portion is in said first orientation,
  wherein, when a determination is made that the longitudinal direction of said display area and the longitudinal direction of the image of said specific portion cross each other, causing the image of said specific portion to be rotated and displayed as being zoomed-in in accordance with the orientation of holding of said display portion as the orientation in which said display portion is held is changed from the first orientation to the second orientation, and
  wherein, when a determination is made that the longitudinal direction of said display area and the longitudinal direction of the image of said specific portion do not cross each other, causing the image of said specific portion to be displayed as being zoomed-in without rotating the image as the orientation in which said display portion is held is changed from the first orientation to the second orientation.

12. The non-transitory computer readable recording medium of claim 11, wherein said specific portion is a portion displaying a preview screen of image data that has been processed.

13. The non-transitory computer readable recording medium of claim 11, wherein said specific portion is a portion wherein an image is displayed for accepting an instruction for an operation on said operational display device.

14. The non-transitory computer readable recording medium of claim 13, wherein said portion wherein the image is displayed for accepting an instruction for an operation is a portion wherein a list of a plurality of images for accepting instructions for operation is displayed in a scrollable manner.

15. The non-transitory computer readable recording medium of claim 14, said recording a program executable by a computer of an operational display device including a display portion for displaying an image based on image data including a specific portion, said program further causing said computer to perform:
  increasing the number of the images for accepting an instruction displayed in said list without scrolling by enlarging the image of the portion to display an image for accepting an instruction for operation.

16. The non-transitory computer readable recording medium of claim 11, recording a program executable by a computer of an operational display device including a display portion for displaying an image based on image data including a specific portion, said program further causing said computer to perform:
  displaying, in said display portion, the image data including a plurality of specific portions;
  accepting, from an input portion, selection of one said specific portion from among said plurality of specific portions; and
  providing a zoom-in display of an image of said selected specific portion when the orientation in which said display portion is held is changed from said first orientation to said second orientation.

17. The non-transitory computer readable recording medium of claim 11, recording a program executable by a computer of an operational display device including a display portion for displaying an image based on image data including a specific portion, said program further causing said computer to perform:
  cancelling zoom-in display of said specific portion when the orientation in which said display portion is held is changed from said second orientation to said first orientation.

18. The non-transitory computer readable recording medium of claim 11, said recording a program executable by a computer of an operational display device including a display portion for displaying an image based on image data including a specific portion, said program further causing said computer to perform:
  providing, in said display portion, maximum display of the image of said specific portion without changing an aspect ratio when the orientation in which said display portion is held is changed from said first orientation to said second orientation.

19. An operational display device, comprising:
- a display portion for displaying an image based on image data including a specific portion;
- a detection portion for detecting an orientation in which said display portion is held; and
- a processor for controlling a manner of display on said display portion,
- said processor causing an image of said specific portion to be rotated and displayed as being zoomed-in in accordance with an orientation of holding of said display portion when the orientation in which said display portion is held is changed from a first orientation to a second orientation,
- wherein a longitudinal direction of a display area on said display portion is changed when the orientation in which said display portion is held is changed from said first orientation to said second orientation,
- said processor determines whether the longitudinal direction of said display area and a longitudinal direction of the image of said specific portion cross each other when said display portion is in said first orientation,
- when said processor determines that the longitudinal direction of said display area and the longitudinal direction of the image of said specific portion cross each other, said processor causes the image of said specific portion to be rotated and displayed as being zoomed-in in accordance with the orientation of holding of said display portion as the orientation in which said display portion is held is changed from the first orientation to the second orientation, and
- when said processor determines that the longitudinal direction of said display area and the longitudinal direction of the image of said specific portion do not cross each other, said processor causes the image of said specific portion to be displayed as being zoomed-in without rotating the image as the orientation in which said display portion is held is changed from the first orientation to the second orientation.

* * * * *